US009367591B2

(12) United States Patent
Kanemoto et al.

(10) Patent No.: US 9,367,591 B2
(45) Date of Patent: Jun. 14, 2016

(54) CLIENT SYSTEM AND SERVER

(71) Applicant: OK Wave, Tokyo (JP)

(72) Inventors: Kaneto Kanemoto, Shibuya-ku (JP); Yoshinori Kato, Shibuya-ku (JP)

(73) Assignee: OK Wave, Tokyo (JP)

( * ) Notice: Subject to any disclaimer, the term of this patent is extended or adjusted under 35 U.S.C. 154(b) by 297 days.

(21) Appl. No.: 13/786,776

(22) Filed: Mar. 6, 2013

(65) Prior Publication Data

US 2013/0238601 A1    Sep. 12, 2013

(30) Foreign Application Priority Data

Mar. 6, 2012    (JP) .................................. 2012-48869

(51) Int. Cl.
*G06F 17/30* (2006.01)

(52) U.S. Cl.
CPC .... *G06F 17/30554* (2013.01); *G06F 17/30699* (2013.01); *G06F 17/30867* (2013.01)

(58) Field of Classification Search
CPC .................... G06F 17/30867; G06F 17/30554; G06F 17/30699
See application file for complete search history.

(56) References Cited

U.S. PATENT DOCUMENTS

| 5,963,939 | A * | 10/1999 | McCann et al. | |
|---|---|---|---|---|
| 6,460,036 | B1 * | 10/2002 | Herz | 707/748 |
| 6,519,590 | B1 * | 2/2003 | Reddy | |
| 7,027,975 | B1 * | 4/2006 | Pazandak et al. | 704/9 |
| 2002/0026435 | A1 * | 2/2002 | Wyss et al. | 707/1 |
| 2004/0249650 | A1 * | 12/2004 | Freedman et al. | 705/1 |
| 2004/0254917 | A1 * | 12/2004 | Brill et al. | 707/3 |
| 2005/0071328 | A1 * | 3/2005 | Lawrence | 707/3 |
| 2012/0116982 | A1 * | 5/2012 | Yoshida et al. | 705/304 |

FOREIGN PATENT DOCUMENTS

| JP | 2003-228585 A | 8/2003 |
|---|---|---|
| JP | 2006-107520 A | 4/2006 |
| JP | 2007-034772 A | 8/2007 |
| JP | 2007-249899 A | 9/2007 |
| JP | 2009-129103 A | 6/2009 |

OTHER PUBLICATIONS

European Search Report in EP Application No. EP13 15 8021.9, Issue Date Jul. 1, 2013.
Joachim Griesbaum; University of Constance, Development trends in Web Information Retrieval: New potential for the Web research through personalization and Web 2.0 technologies?, 2007.

(Continued)

*Primary Examiner* — Shiow-Jy Fan
(74) *Attorney, Agent, or Firm* — Masuvalley & Partners

(57) ABSTRACT

Embodiments of the present invention provide a client system and a server for searching, through the Internet, useful information that matches more closely a user's intention. The system is used for searching questions or answers posted by members in a Q&A (question and answers) site which is used by users who are registered as members. The members are then classified into multiple types based on a database, in which posted questions and answers were separated, and attribute information of members. For each question and answer, the tendency of the type who often supports the contents is stored. In this way, a question or answer is searched based on not only a search keyword but also on a type of searcher.

12 Claims, 18 Drawing Sheets

(56) References Cited

OTHER PUBLICATIONS

Silvia Quarteroni et al.; The University of York, User Modelling for Personalized Question Answering, Sep. 10, 2007, p. 386-397.

Jaime Teevan et al; Microsoft Research Redmond, WA 98052 USA, Discovering and Using Groups to Improve Personalized Search, p. 15-24, Feb. 12, 2009, New York.

* cited by examiner

FIG. 13

Question extraction result

1) What are the main attractions of Mt.Fuji?
2) Where are popular tourist attractions of Mt. Fuji?
3) I am visiting Mt.Fuji, is there any nearby restaurant that you recommend?
4) I am planning to climb Mt.Fuji in the summer break. What are the main attractions of Mt.Fuji?
5) I'd like to visit not only Mt.Fuji, but also some site-seeing spots in the surrounding area. Which route do you recommend?
6) I am moving to Fuji-city. Do you know if there is any good restaurant in the neighborhood?
7) Which area has a nice view of Mt.Fuji, and has good access to transportation?
etc Answer extraction result 1) I recommend bus tours by oo- travel agency.
2) It is hands-down the best to see the sunrise from the summit.
3) You can see a nice view from the windows of a bullet train. If you are taking a bullet train from Tokyo-station, I recommend that you sit on a seat on the right side.
4) A view of Mt.Fuji from an open-air bath of oo hotel is amazing. Especially in the season of fall foliage, the surrounding area of the hotel is ablaze with fall colors, and you can enjoy fantastic views. The meals at the hotel are quite nice as well.
5) The lodge located at the $8^{th}$ station of Mt.Fuji sells rare souvenirs, and they are appreciated by fans.
6) You can see the cloud sea even from the halfway through. It is very beautiful.
7) At the outlet mall in Gotenba, you can do shopping while enjoying a view of Mt. Fuji, which is nice!
8) When driving down the Central Highway, there is a section that you can see Mt.Fuji straight ahead of you.
9) A view of Mt. Fuji from the shores of Lake Motosu is superb.
10) Try taking Route 300. There is not much traffic, and it's a switchback that is fun for those who like to drive fast!
11) Soba-ya XX located 10 minute walk from Shin Fuji-station serves delicious Soba-gaki.
12) If you are taking a child, Fuji Safari Park and Fujisan Children's Land are located nearby.
13) Souvenir oo of Shinfuji-station has many secret fans.
14) Fresh water flowing from XX was chosen as one of the 100 best water in Japan. It is very delicious water.
15) First, go visit Fujisan Hongu Sengen Taisha. Then, ...
etc

FIG. 14

| Question | Type | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | .... | 62 | 63 | 64 |
| Q1) What are the... | | 1 | | 5 | 6 | 6 | 8 | | | | | | | 1 | | |
| Q2) Where are popular.... | | 1 | | | 9 | 2 | 7 | 2 | 3 | | 5 | 4 | | 7 | 2 | 1 |
| Q3) I am visiting Mt.Fuji ... | | | 25 | | | 6 | 1 | 1 | | 5 | 1 | | | | | |
| Q4) I am planning to climb Mr. Fuji... | | 1 | 6 | | 5 | 1 | 30 | | 1 | | | 2 | | 1 | | 8 |
| Q5) I'd like to visit not only Mr. Fuji... | | | 15 | | 10 | 34 | 5 | | | 5 | 1 | | | | | |
| Q6) I am moving to Fuji-city.... | | | 18 | | 2 | 4 | 1 | | 4 | | 1 | | | 2 | 3 | |
| Q7) Which area has a nice view of Mr. Fuji | 1 | | 2 | | 10 | 10 | 4 | 3 | 3 | | | | | | | |

| Answer | Type | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | .... | 62 | 63 | 64 |
| A1) I recommend bus tours.... | 1 | 2 | 8 | | 5 | 3 | 5 | | 5 | | | | | 1 | 1 | |
| A2) It is hands-down... | | 1 | | | 15 | 3 | 31 | | | | | | | 4 | | |
| A3) You can see a nice view... | | | | | 12 | 8 | 1 | | | | | | | | | |
| A4) A view of Mt.Fuji from ... | | | 15 | | 17 | 9 | 2 | | | | | | | | 2 | |
| A5) The lodge located at the 8th station ... | | | 10 | | | 1 | 20 | | | | | | | | | 3 |
| A6) You can still see the cloud sea... | | | | | 27 | 1 | 15 | | | | | | | | | |
| A7) At the outlet mall in Gotenba... | | | 5 | | 10 | 20 | 1 | | | | 4 | | | | | |
| A8) When driving down the Central Highway... | 1 | | | | 9 | 7 | 2 | | | | 4 | | | | 1 | |
| A9) A view of Mt. Fuji from the shores.... | | | 1 | | 14 | 8 | 2 | 1 | | | | | | | | |
| A10) Try taking Route 300.... | | | | | | 10 | 2 | | | 4 | | | | | | |
| A11) Soba-ya XX located... | | | 20 | | 1 | 11 | 1 | | | | | | | 1 | | |
| A12) If you are taking a child.... | | | | | | 15 | 1 | | | | | | | | | |
| A13) Souvenir oo of Shinfuji-station... | | | 16 | | 3 | 4 | 3 | | | | | | | | | |
| A14) Fresh water flowing from XX.... | | | 10 | | 4 | 2 | 25 | | | | | 1 | | 5 | | 4 |
| A15) First, go visit Fujisan.... | 1 | | | | 5 | 6 | 1 | | | 4 | | 1 | | | | 4 |

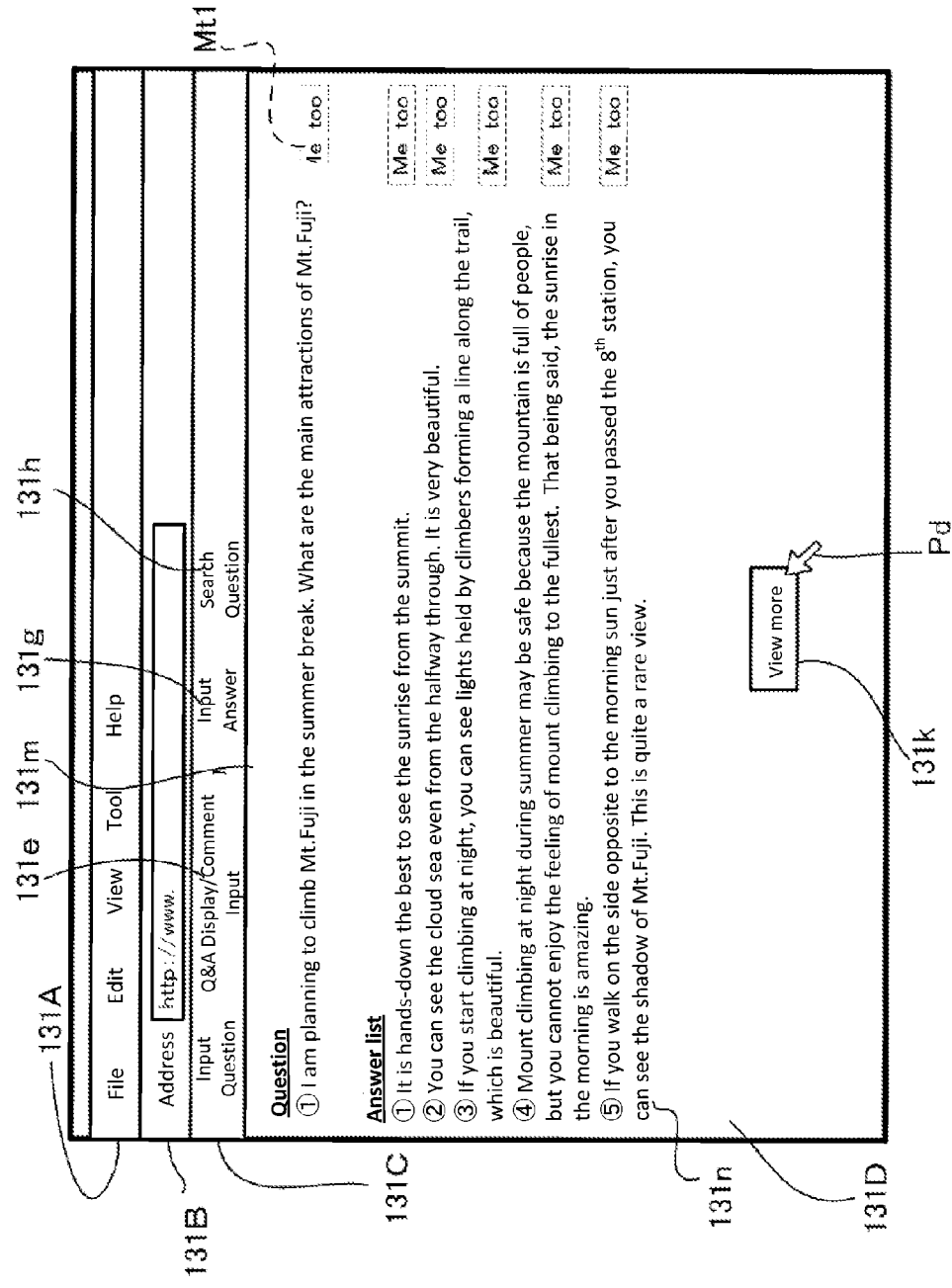

CLIENT SYSTEM AND SERVER

This application claims priority under 35 U.S.C. §119 to Japanese Patent Application Serial No. 2012-48869, filed on Mar. 6, 2012, entitled "Client System and Server", which is hereby expressly incorporated by reference in its entirety for all purposes.

TECHNICAL FIELD

The present invention generally relates to client systems and servers. More specifically, it relates to a client system and a server for performing search based on a desired keyword through the Internet.

BACKGROUND OF THE INVENTION

In the case of a conventional approach for searching desired information through the Internet, a search site is commonly used. In the search site, the search is carried out based on a plurality of keywords inputted through a keyword input section.

Thereafter, a search result list is displayed on a screen, in which titles of the home pages are arranged from top to bottom in order to their highest degree of matching level to the inputted keyword. The displayed list is associated with a link. Thus, clicking the list by a pointing device results in the home page included in the list.

However, in the conventional search site, really useful information for the research user is not often displayed on the search result display screen. Furthermore, only from the displayed list, the user can not understand what information is included in the sites which are displayed in the list. Therefore, the user must confirm contents of the displayed list by clicking the lists one by one for reading the contents. Furthermore, even when the contents of the sites are displayed, the user must read all of the contents until desired information are found, thus requiring a long time to extract desired information.

In addition, the search result list may sometimes contain duplicated contents having the same description, thus causing an extreme difficulty in finding valuable information from the search result list.

On the other hand, although it is difficult to use the conventional search site to find information which matches intention of the user, there may also be a case where the user can incidentally encounter more valuable information, even if the user does not intend to find such information.

As described above, the search site user may use the search site in order to obtain desired information by inputting a keyword. However, the user sometimes uses the search site while not knowing the information potentially desired. Furthermore, the user can not even input a keyword for searching information which is valuable to him or her if he or she does not know the information.

The present invention is proposed in view of the above aforementioned problems. The present invention provides a client system and a server in which useful information that may match more closely with the user's intention can be searched through the Internet.

SUMMARY OF THE INVENTION

The present invention for solving the problems as described above has a configuration as shown below.

(1) A client system comprising:
a display means for displaying an image on a screen;
a reception means for receiving search result question information or search result answer information, screen data for displaying a search information input region for inputting search information, and a search result display region for displaying searched questions or answers;
a control means for controlling the display means to perform an operation to display a searched question or an answer; and a transmission means for transmitting identification information for identifying the user, and search information for searching for a question or an answer.

(2) A server comprising:
a question information accumulation means for accumulating a question;
an answer information accumulation means for accumulating an answer to the question;
a reception means for receiving search information for searching for a question or an answer;
a question search means for searching for a question from the question information accumulated in the question information accumulation means;
an answer search means for searching an answer from the answer information accumulated in the answer information accumulation means; and
a transmission means for transmitting the search result question information and the search result answer information.

(3) The client system according to (1), wherein the reception means further receives order information showing the searched question or answer, and screen data for displaying a specifying region for inputting a evaluation information to each displayed question or answer, the controlling means further controls the display means to perform an operation to show specifying regions on the respective displayed question or answer, and the transmission means further transmits evaluation information to a specific question or answer.

(4) The server according to (2), further comprising user information storage means for storing attribute information of the respective user.

(5) The server according to (2), wherein the reception means further receives identification information for identifying a user, and evaluation information to a specific question or answer.

(6) The server according to (2), wherein the transmission means further transmits order information of the searched question information or the searched answer information decided based on an order of the matching with the attribute information of the user.

(7) The surver according to (5), further comprising a question information update means for updating question information based on the received user identification information and evaluation information.

(8) The surver according to (5), further comprising an answer information update means for updating answer information based on the received user identification information and evaluation information.

(9) The surver according to (2), wherein the question information accumulation means accumulates a question from the user so that the question is associated with the attribute information of the user posting the question and the attribute information of the user evaluating the question.

(10) The surver according to (2), wherein the answer information accumulation means accumulates an answer to the question from the user so that the answer is associated with the attribute information of the user posting the answer and the attribute information of the user evaluating the answer.

(11) The server according to (2), further comprising other sites extraction means for extracting other sites, wherein the question search means comprises other sites question search means for searching for questions from the accumulated question information in the question information accumulation means of extracted other Q&A sites, the answer search means comprises other sites answer search means for searching for answers from the accumulated answer information in the answer information accumulation means of the other Q&A sites searched by the other sites search means, and the transmission means also transmits other sites search result question information searched by the other sites question search means and other sites search result answer information searched by the other sites answer search means.

(12) The server according to (11), wherein the other sites extraction means is configured to extract the other sites based on the predetermined address of the website.

(13) The server according to (11), wherein the other sites question search means comprises:

a link extraction means for extracting links from pages included in sites extracted by the other sites extraction means;

a Q&A link extraction means for extracting links to the pages that posted questions or answers to questions from extracted plural links; and a question sentence extraction means for extracting a question sentence among the pages of the sites extracted by the Q&A link extraction means.

(14) The server according to (11), wherein the other sites answer search means comprises:

a link extraction means for extracting links from pages included in sites extracted by the other sites extraction means;

a Q&A link extraction means for extracting links to the pages that posted questions or answers to questions from extracted plural links; and an answer sentence extraction means for extracting an answer sentence among the pages of the sites extracted by the Q&A link extraction means.

(15) A method for searching for a question or an answer comprising:

collecting a question or an answer to the question from a user;

accumulating the question and the answer separately; and receiving identification information for identifying the user, and evaluation information to a specific question or answer.

(16) The method according to (15), further comprising classifying the user to multiple types based on the identification information.

(17) The method according to (16), further comprising: identifying the type of searching user; and performing search for the question or the answer based on the type.

According to the client system of the present invention, the questions and answers which were accumulated in the state of associating are separated, and search is performed based on the respective accumulated information respectively. Thus, the useful search results that users did not anticipate may be acquired. In addition, questions and answers of the search result information are displayed separately in the state of being released association between questions and answers. Thus, the useful information that users did not anticipated may be recognized when users confirm the search result.

According to the server of the present invention, the questions and answers which were accumulated in the state of associating are separated, and accumulated respectively. Thus, the useful search results that users did not anticipate may be searched by searching respective accumulated information independently. In addition, the search result information is constituted as to display question and answers separately as display information in the state of being released association between questions and answers. Thus, the useful information that users did not anticipated may be recognized when users confirm the search result.

Furthermore, according to the client system of the present invention, potential to-be-searched information can be added to the question and answer by expressing the evaluation to the question and answer. Thus, a search can be performed in consideration of not only search information but also the attribute information of the searcher to display the search result, thus displaying a search result more matching the intention of the searcher.

Moreover, according to the surver of the present invention, potential to-be-searched information can be added to the question and answer by expressing the evaluation to the question and answer. Thus, a search can be performed in consideration of not only search information but also the attribute information of the searcher to display the search result, thus displaying a search result more matching the intention of the searcher.

In addition, according to the server of the present invention, questions and answers in other search sites can be also searched. Thus, the search can be performed in a wider range, thus providing more information to the searcher.

According to the server of the present invention, other sites targeted for search can be extracted in advance. Thus, the search time can be shorted.

According to the server of the present invention, links included in the site are extracted, links of the page that placed the answer and question are extracted from extracted plural links and the page that placed the question and answer is selected finally, and the question sentence of the page is extracted. Thus, user can search for a question sentence easily by tracing the link in this way.

According to the server of the present invention, links included in the site are extracted, links of the page that placed the answer and question are extracted from extracted plural links and the page that placed the question and answer is selected finally, and the answer sentence of the page is extracted. Thus, user can search for an answer sentence easily by tracing the link in this way.

BRIEF DESCRIPTION OF THE DRAWINGS

FIG. 2 is a block diagram illustrating the configuration of a user terminal, a server and the like.

FIG. 13 is a table illustrating the search result prior to prioritization.

FIG. 14 is a table illustrating the data configuration of support data.

FIG. 18 is a plan view similarly illustrating the question answer screen.

DETAILED DESCRIPTION OF INVENTION

Figure 1:
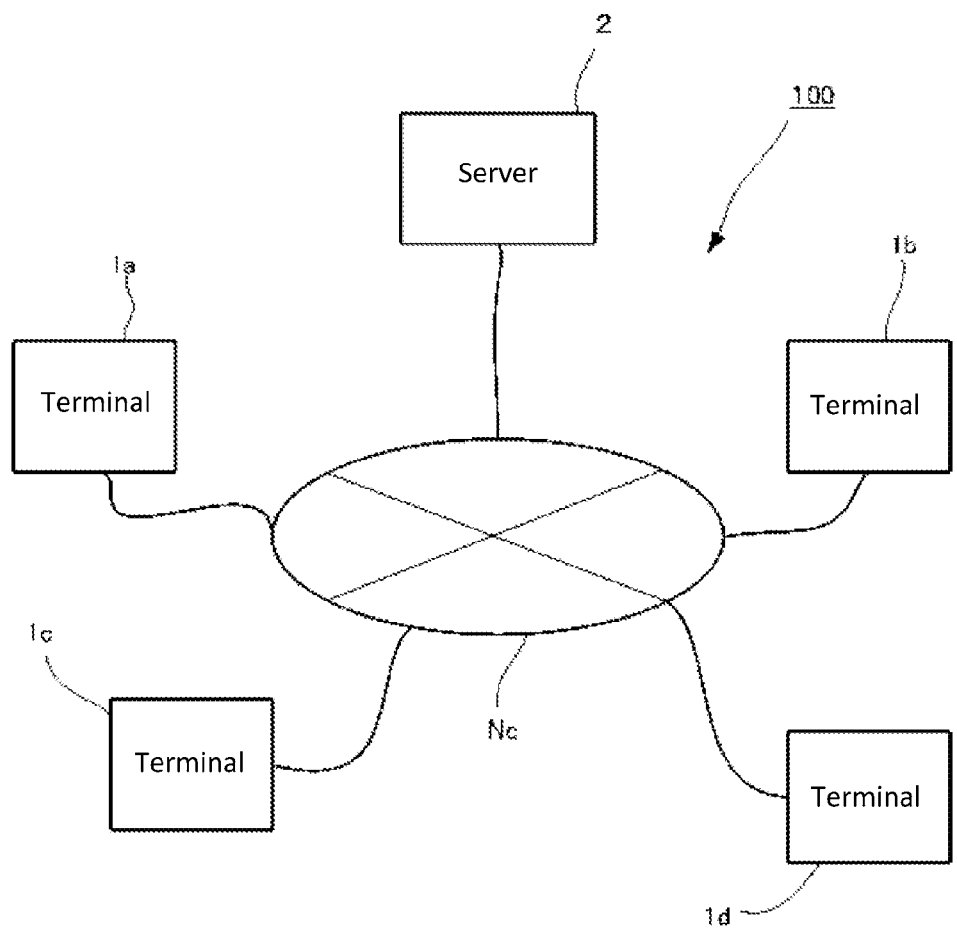
FIG. 1 is a conceptual view illustrating a system configuration of the client system 100 of an embodiment according to the present.

The following section will describe in detail a preferred embodiment of the client system 100 of the present invention with reference to the attached drawings. FIG. 1 is a conceptual diagram illustrating the system configuration of the client system 100. The client system of this embodiment is a Q&A system, in which members were registered in advance, questions are collected from members on the site, answers to the collected questions from the members are collected from members, and a database of the questions and the answers to the questions is made.

As shown in FIG. 1, the client system 100 is configured so that the user terminals 1a to 1d and the server 2 and a general server (not shown in FIG. 1) are connected via the network Ne.

The network Ne includes, various communication lines such as a telephone network, an ISDN (Integrated Services Digital Network) network, an ADSL communication network, an optical communication network, an exclusive line, a mobile communication network, a communication satellite connection, and a CATV network, and the Internet service provider base station connecting them. The network Ne also may be an intranet functioning as a network in a limited area. The intranet means a network in a limited area, which is configured by the connection of a server and a plurality of clients and allows the information or resource to be shared among the connected server and plurality of clients. The network Ne may be connected at an arbitrary timing and is not required to be always connected. Although a wired line is shown between the respective terminals, a wireless line also may be used.

The user terminals 1a to 1d are a terminal that is configured, for example, by a general-purpose personal computer (PC) 1a, a laptop PC 1b, a PDA (Personal Digital Assistant) 1c, a mobile phone 1d, and other multifunctional mobile terminal such as tablet type terminal, etc. The user terminals 1a to 1d are managed by members using the Q&A system 100 or a system administrator. The user terminals 1a to 1d are collectively shown as "user terminal 1".

The user terminal 1 includes a browser that is application software for browsing a website. Through this browser, users access the HP (home page, hereinafter, home page is referred to as a Q&A search site) provided by the server 2. Then, users sent and receive information via the Q&A search site provided by the server 2 to thereby get services (e.g., posting or browsing of a question, an answer, or a comment, the pronouncement of the evaluation to a question or an answer, the input of a search keyword, browsing of a search result, etc., or Q&A search, etc.).

The user can browse the Q&A search site via the user terminal 1 and also can register himself or herself as a member. For member registration, the user who wants to be a member, namely a specific user uses the member registration screen in the Q&A search site via the user terminal 1 to send to the server 2 such user information as a user ID, a password, a name, a member No., an age, a profession, an annual income, a sex, a post, a mail address, a telephone number, a specialized field, a job category, an area of specialty, hobby, a resident area (address or a office address), favorite food (e.g., sweet or hot food). The user information is registered in the server 2 and stored in a storage section (26, see FIG. 2) provided in the server 2. Then, after the member registration, the member sends, prior to the use of the Q&A search site, the login information including the user ID and the password to the server 2 for login authorization and subsequently can use the Q&A search site.

The login information is not limited to the user ID and the password and may include, for example, a mail address, a name and a member No. so long as information included in the above-described user information can be used to perform login authorization.

Alternatively, instead of performing the user registration, another configuration also may be used in which a question, an answer, or a comment is posted together with the input of user-identifiable information (e.g., name, address, age [date of birth], profession, annual income, sex, post, mail address, telephone number) so that the authority to use the Q&A system 100 is permitted.

Figure 2:
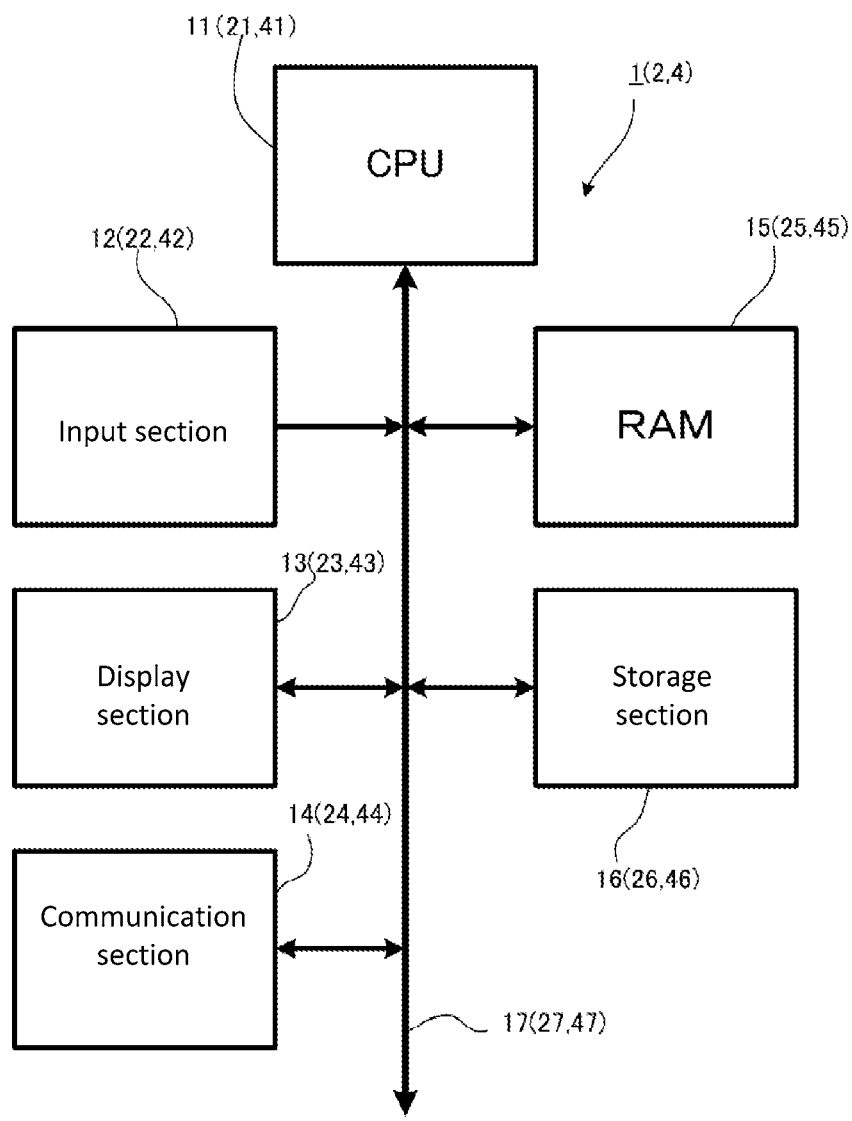

With reference to FIG. 2, the following section will describe an example of the internal configuration of the user terminal 1. FIG. 2 is a block diagram illustrating the main configuration of the user terminal 1 functioning as a communication terminal. As shown in FIG. 2, the user terminal 1 is configured, for example, by the CPU (Central Processing Unit) 11 functioning as a control means, the input section 12, a display section 13 functioning as a display means, a communication section 14 functioning as a transmission means and reception means, an RAM 15, and a storage section 16. The respective sections are connected by a bus 17. The CPU 11 develops a program specified from various application programs (e.g., a system program stored in the storage section 16, a web browser) into a work area (not shown) in the RAM to perform, in accordance with the program, various processings depending on the data inputted through the input section 12 to store the processing result in the work memory in the RAM 15. The CPU also generates display information for displaying the processing result to output the information to the display section 13. The CPU 11 reads the browser program from the storage section 16, activates it, and accesses the server 2 to receive, from the Q&A search site, screen data (which will be described later) of the Q&A search site to record the data in the RAM 15 and allows the display section 13 to display the screen of the Q&A search site (see FIG. 3).

Figure 3:
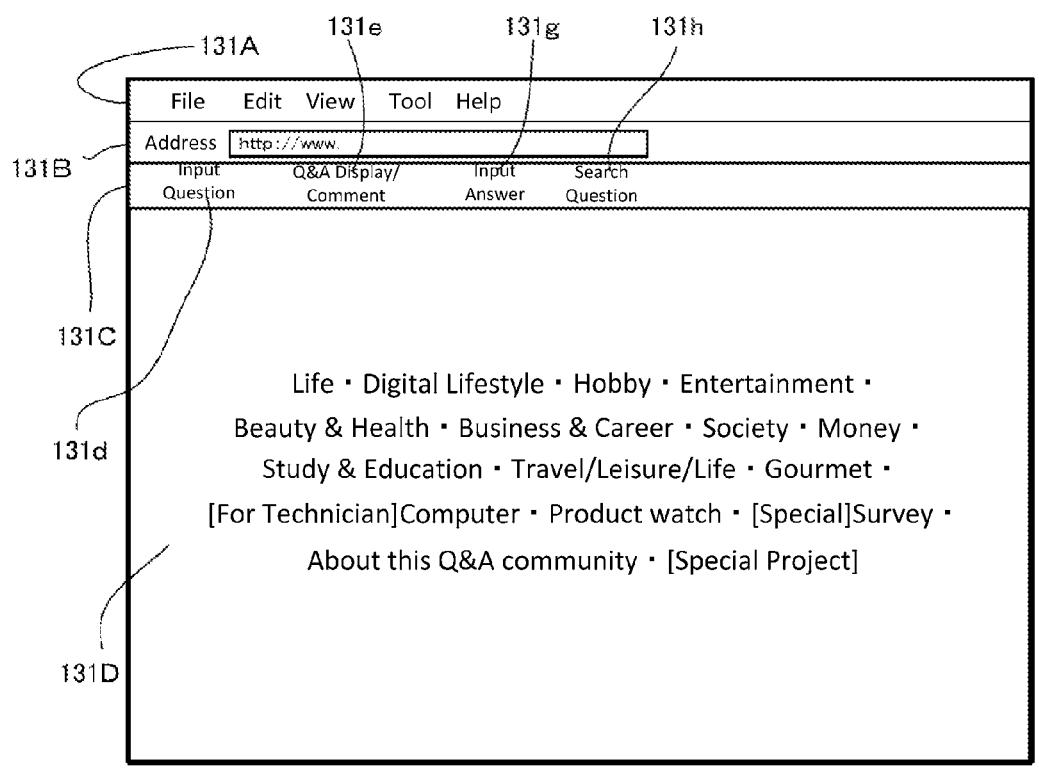
FIG. 3 is a plan view illustrating the display screen of a Q&A site.

FIG. 3 illustrates the above example of the screen displayed on the display section 13. As shown in FIG. 3, a menu bar 131A, an address bar 131B, a Q&A search tool bar 131C, and a display region 131D are provided on the screen 131. Icon buttons of frequently-used functions are displayed side by side in the menu bar 131A. Thus, the respective icons can be operated to thereby realize the functions corresponding to the respective icons. The address of the Q&A search site is displayed in the address bar 131B.

A question input button 131d, a Q&A display/comment input button 131e, an answer input button 131g, and a search question button 131h are provided on the Q&A search tool bar 131C.

The question input button 131*d* is a button to instruct to display a question input screen on the display region 131D. The Q&A display/comment input button 131*e* is a button to instruct to display a screen for displaying a question and an answer and a corresponding comment on the display region 131D. The answer input button 131*g* is a button to instruct to display a screen for inputting the answer to the question on the display region 131D. The search button 131*h* is a button to instruct to display a screen for inputting a search keyword or a search sentence on the display region 131D. Information displayed in the display region 131D is written based on the HTML format, etc. so that a document or an image downloaded via the browser can be displayed. The respective pieces of screen data are received from the server 2.

The input section 12 is configured to include a keyboard (input means) including KANA/alphameric character input keys, a cursor key, and various function keys, etc. and a mouse (specifying means) as a pointing device. The input section 12 outputs to the CPU 11*a* depression signal of a key depressed on the keyboard and a mouse operation signal as an input signal. When the user terminal 1 is a PDA or a mobile terminal, etc., the input section 12 is configured to include a cursor key, a numeric key, and various function keys, etc. The user terminal 1 also may include a pointing device (e.g., a touch panel) or other input devices.

The display section 13 is configured by a CRT (Cathode Ray Tube) or an LCD (Liquid Crystal Display), etc. Based on an instruction by the display signal inputted from the CPU 11, the display section 13 displays the screen of various pieces of display data. For example, the display section 13 allows, depending on the control by the CPU 11, various images (which will be described later) to be displayed on the browser screen 131 including the Q&A search tool bar.

The communication section 14 is an interface that can be connected to a transmission medium connected to various networks such as the LAN (Local Area Network), the WAN (Wide Area Network), or the Internet. Specifically, the communication section 14 is configured by a network interface card, a modem (MODEM: MOdulator/DEModulator) or a terminal adapter (TA: Terminal Adapter), etc. The communication section 14 provides a control for the communication with an external device via the above-described communication line.

The RAM (Random Access Memory) 15 forms a work area for temporarily storing various programs executed by the CPU 11 and data processed by these programs. As described above, screen data downloaded from the server 2 is stored.

The storage section 16 has a storage medium (not shown) in which a program or data, etc. is stored in advance. This storage medium is configured by a magnetic medium, an optical medium or a semiconductor memory, etc. This storage medium is fixedly attached in the storage section 16 or is detachably attached. This storage medium stores therein a system program, various processing programs corresponding to the system, and data processed by various processing programs, etc. A program or data, etc. stored in a recording medium also may be partially or entirely received from other devices (e.g., a server, a client) via a network line transmission medium (e.g., WAN, LAN) from the communication section 14. Alternatively, a recording medium also may be a recording medium of the server established on the network. Alternatively, the program also may be sent via a transmission medium (e.g., a network line) to a server or a client to be installed in these devices.

Specifically, the storage section 16 stores therein an operating system, a browser program, etc. Alternatively, another configuration also may be used in which a Q&A/search tool bar program is installed from a recording medium (e.g., CD-R, memory).

Next, the Q&A community server 2 will be described. It should be noted that the main configuration of server 2 is substantially the same as the above-described user terminal 1. Each component will be described based on the same reference numerals (see FIG. 2) and the configuration will not be further shown or described. The following section will describe a characteristic function of the server 2 and a database included in the server 2.

The server 2 is configured to include the CPU 21 functioning as a processing means, the input section 22, the display section 23, the communication section 24 as a transmission/reception means, the RAM 25, and the storage section 26 as a storage means, etc. The respective sections are connected by the bus 27. The server 2 establishes, on the Internet, a Q&A site and a search site on which members exchange questions and answers regarding a specific phenomenon. In the above-described site, information related to a question, an answer, a comment, the pronouncement of the evaluation to the question and the answer, or a search is received from the user terminal 1. Based on the received information, a search processing (FIG. 9 and FIG. 10) (which will be described), etc. is executed.

Figure 4:
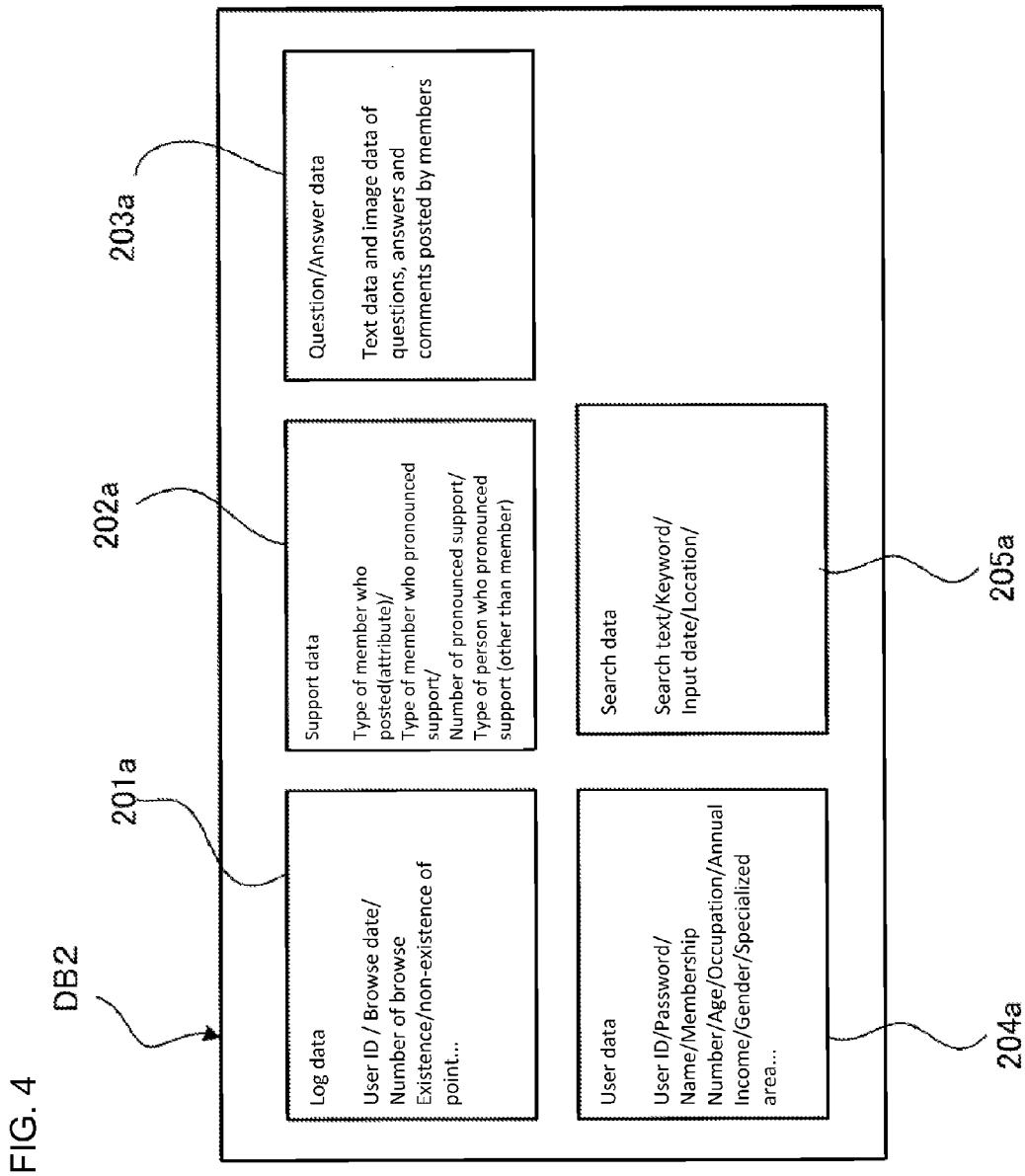
FIG. 4 illustrates the configuration of a database.

The storage section 26 includes a system program, various processing programs corresponding to the system, screen data (which will be described), and various database that stores therein data, etc. processed by various processing programs, etc. The storage section 26 also includes, as shown in FIG. 4, the database DB2 for storing the data accumulated and used in the Q&A system 100. The database DB2 includes a plurality of storage areas and stores information regarding the questions and answers of the member while being classified to log data 201*a*, support data 202*a*, question/answer data 203*a*, user data 204*a*, and search data 205*a*.

The log data 201*a* is data of the user browsed the Q&A search site, such as the user ID, the browse date, the browse number, the existence or nonexistence of point(s), the category in the site visited by the user, a site to which the user has moved from the site, etc. The data such as the browse date or the browse number is stored to correspond to the user ID.

The support data 202*a* is stored to be classified to the support data regarding a question displayed on the search result list and the support data regarding an answer displayed on the search result list. As will be described later, a question displayed on the search result list is not limited to a question posted on the Q&A site and also includes a question posted on other Q&A sites. Similarly, an answer is not limited to an answer posted on the Q&A site and also includes an answer to a question posted on other Q&A sites.

The support data is data that shows whether the contents of a question or an answer displayed on the search result screen are supported by the user or not. The database of the support data 202*a* is prepared so that the support data is associated with each question sentence and each answer sentence, the number of the respective members showing the pronouncement of the evaluation, and the attribute information of the members, and the time and the place (e.g., an IP address) of the pronouncement of the evaluation. When a person showing the pronouncement of the evaluation is not a member, the support data is stored to be associated with at least the time of the pronouncement of the evaluation and the place (e.g., an IP address) of the support pronouncement. This pronouncement of the evaluation includes the support pronouncement for supporting the content positively, and the non-support pronouncement for showing a negative opinion to the content.

For example, the former is a case that the user sympathizes with the question or answer and feels that it is useful, and the latter is a case that the user feels it useless and feels that an answer is wrong. Generally, for acquiring data, it is easy to acquire the data of the pronouncement of positive evaluation (easy to acquire information from a user). Therefore, in the following embodiment, it is described as a specific example of the case that support pronouncement for supporting the question or answer positively is acquired.

As specific constitution, the number of the times in which the user showed a support to the question or the answer via the support pronouncement button is included. If the user who shows a support is a member, the member attribute information is also included. When the user is not a member, the time and place of the support pronouncement are stored as data. These data are stored for each question and answer.

For example, the member attribute information associated with each question or answer is stored based on the method as shown below. Specifically, the user data {name, ID name (or the tendency of the name), sex, birth date, age, address, mail address name (or the tendency thereof), profession, annual income, interested category} as well as the respective tendencies of "having made a question", "having saw a question", and "having evaluated a question" and the respective tendencies of "having made an answer", "having saw an answer", and "having evaluated an answer", the time and the date of the access to the site, and the IP address (place) are analyzed to calculate the tendency value for the member for each type. Based on the tendency value, the member is classified to an arbitrary number of types (e.g., 31 types, 64 types).

Each question or each answer has a member who have posted the question or answer and a member who have showed a support pronouncement. Thus, each member type is stored as support data to each question or each answer.

When a person having showed a support pronouncement is not a member, then the type of the person having showed the support pronouncement is determined based on the method as described below. Specifically, when a user browses the site of the present invention, a "cookie" is given to the Internet browser of the user. The cookie can be used to know the activity of the user on the browser (e.g., the time, the date, the IP address (place) on the site). Then, based on the match rate between the time, date, or IP address (place) and the user type determined in advance, the person is classified to the most matched type. When the user is not a member who posted a question or an answer, the activity of the user on the site are not only analysed, but also sex, age, and personality, etc. of the user are inferred from the content of the posted sentence. Thus, taking into account such elements, the user is classified to the most matched type.

The question/answer data 203a is information regarding a question, an answer, and a comment posted on the Q&A search site by a member. The question/answer data 203a is stored as text data or image data to correspond to the user ID. A question and an answer are respectively associated and are stored in separate regions (i.e., a region for storing questions only and a region for storing answers only). The number of the questions, answers, and comments, a question category covering these questions, answers, and comments and the elapsed time from the question posting to the answer posting are stored to correspond to the information regarding the respective questions. A past post sentense (a question sentence and an answer sentence) is analyzed and the frequency of the use of each word is stored for the word used in the posting. A ranking of members having a higher frequency of the use of the word is also prepared and stored. As will be described later, with regard to a question sentence or an answer sentence extracted from other Q&A sites through a search, the home page address displaying the question sentence or answer sentence is stored. When a support is pronounced for the question or answer, then the support data is similarly prepared.

The user data 204a is user information (attribute information (e.g., unique characteristic or feature of the registered member)) of the user registered as a member (specific user) in the Q&A search site and is stored to correspond to a user ID. Specifically, the user information includes the password stored to correspond to the user ID, the name, the member No., age, profession, annual income, sex, post, mail address, telephone number, specialized field, job category, area of specialty, hobby, resident area (address or office address), favorite food or drink (e.g., sweet or hot food), a category registered as an answer specialized field, and an acquired point, etc. Based on the log data and the user data, the types of the respective members are identified and the member type is also stored as user data. In the user data 204a, the data related to the users who are not registered as members is also stored. Area for storing the user data is provided in relation to the person who posted the question, the person who posted the answer, and the person who pronounced the support, etc. With respect to the data of this general user, IP address, etc. are registered as identification information, and the result of classification to the later-described types is stored.

The search data 205a includes a search sentence, a search keyword, and an input date or place (IP), etc. and is stored to be associated with the user information.

Various data stored in the above-described database DB is appropriately sent to the user terminal 1 as required and is appropriately updated based on the data supply from the user terminal 1.

A question information accumulation means consist of the support data 202a in the database DB2 and the question data (FIG. 11) of question/answer data 203a. An answer information accumulation means consist of the support data 202a and the answer data (FIG. 11) of the question/answer data 203a.

Next, the following section will describe the servers 4 of other Q&A sites (hereinafter referred to as "server 4"). The server 4 is configured to include the CPU 41, the input section 42, the display section 43, the communication section 44, the RAM 45, and the storage section 46, etc. The respective sections are connected by the bus 47. The server 4 opens, on the Internet, a home page in which a user can publicize an arbitrary question. The storage section 46 includes the database DB4. The server 4 collects a question for a registered user and collects answers for the question. The server 4 provides contents publicly disclosing on the home page question information and answer information collected from the members and provides the contents on the Internet.

Figure 5:
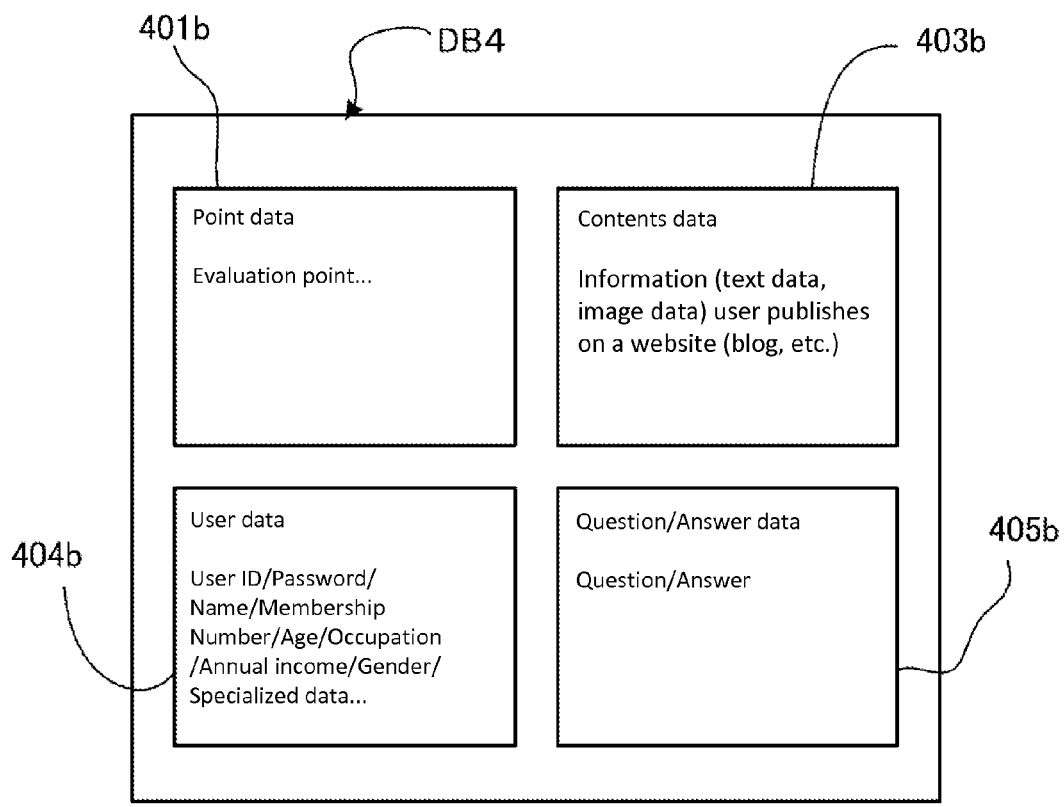
FIG. 5 illustrates the configuration of a database of another Q&A site.

As shown in FIG. 5, the database DB4 includes a plurality of storage areas and is classified to the user data 404b, the point data 401b, the contents data 403b, and the question/answer data 405b and is stored in the respective areas.

The attribute information of the user publicizing the home page or blog (e.g., user ID, password, full name, member No., age, profession, annual income, sex, post, telephone number, specialized field, job category, area of specialty, hobby, resident area (address or office address)), and contact information are stored in the user data 404b. In the contents data 403b, for example, information (text data, image data) publicized by the user in the site (e.g., blog) are stored. In the question/answer data 405b, a question sentence used by the site member to make a question and an answer to the question are stored. A member information storage means consist of the user data 404*b* and the log data 201*a*. In the following section, the operation of this embodiment will be described.

Figure 6:
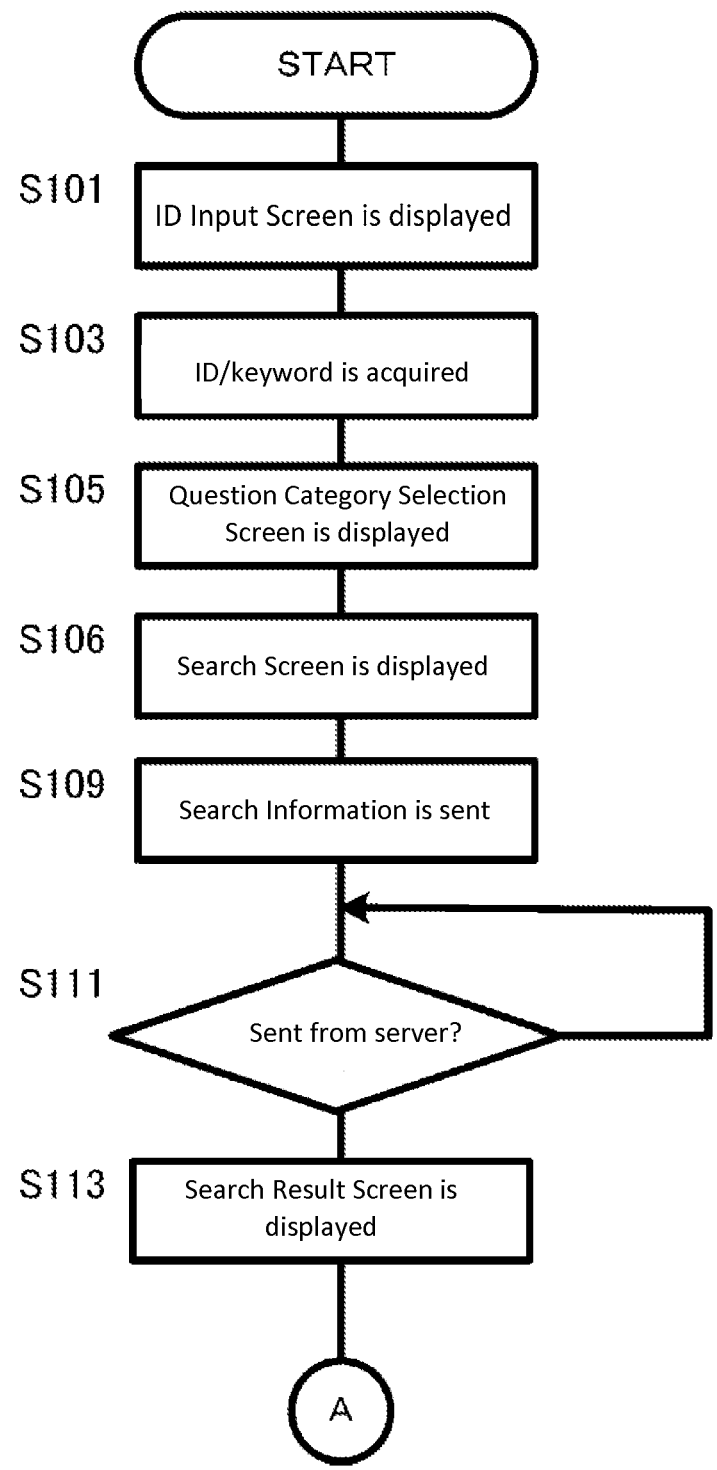
FIG. 6 is a flowchart illustrating the processing of the user terminal.
Figure 7:
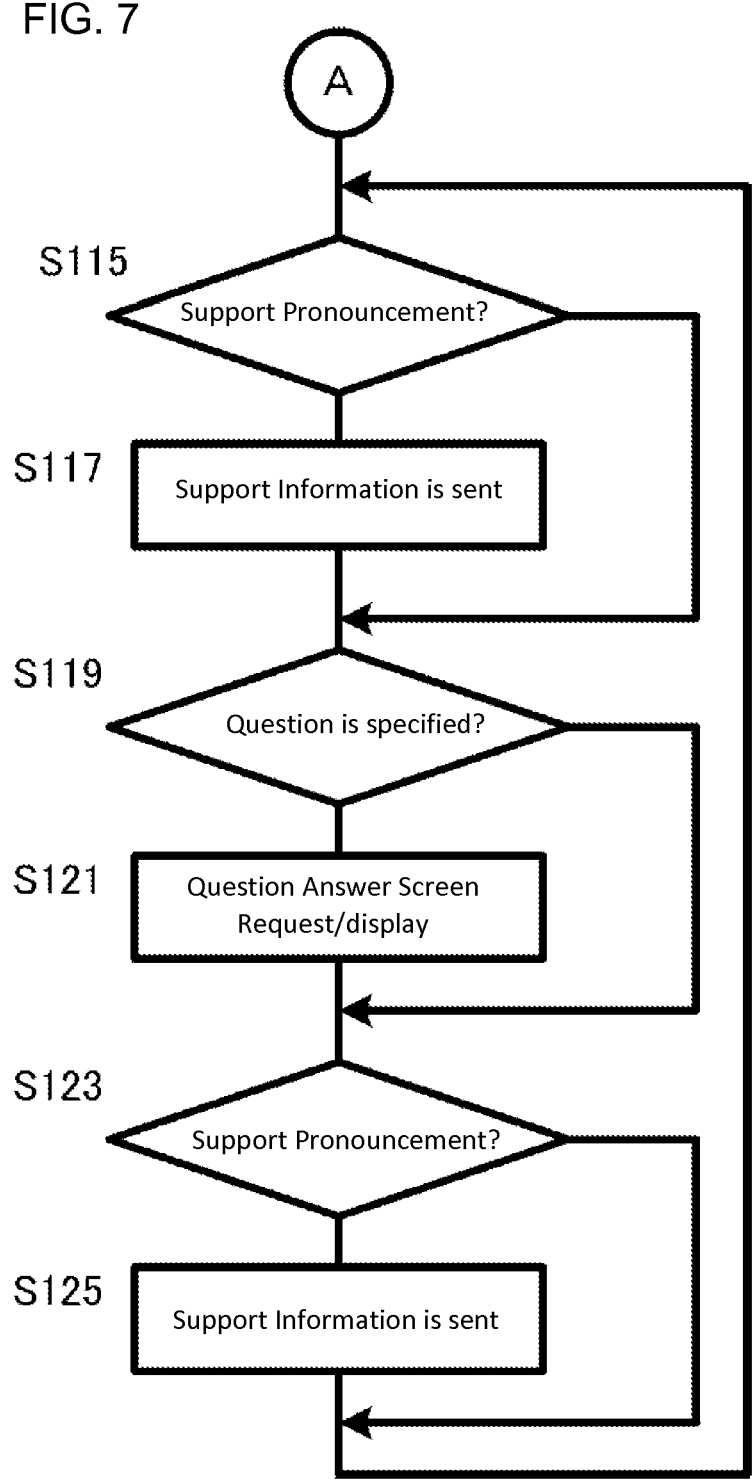
FIG. 7 is a flowchart illustrating the processing of the user terminal.

The following program for realizing the respective functions shown in the flowcharts in FIG. 6 and FIG. 7 are stored, in the form of a readable program code, in the storage section 26 of the server 2. The CPU 21 sequentially executes the operations based on this program code. Alternatively, program/data externally supplied from a CD-ROM or a DVD-ROM, etc. (not shown) can be used to perform the operation specific to this embodiment.

The following section will describe the procedure at the user terminal 1-side with reference to FIG. 6 and FIG. 7. The following section will describe a case where the user terminal 1 is used by a member as a searcher for searching for a question and the user terminal 1 functions as a searcher terminal. An ID input screen is displayed which is received from the Q&A site accessed by the browser (Step S101). Then, the user ID and the password of the searcher inputted to a predetermined area in the ID input screen are acquired and are sent to the server 2 (Step S103). The server 2 can acquire the user ID identifying the member to thereby identify the searcher attribute information, the question information, and the answer information.

After receiving from the server 2 an answer of approval and the data of various categories displayed on the question category selection screen (FIG. 3) (which is stored in the storage section 26 of the server 2), the received question categories are displayed on the question category selection screen (FIG. 3) (Step S105). In the example shown in FIG. 3, multiple categories are displayed in the display region 131D. The multiple categories are expected to include the contents of the searched question. The categories are roughly classified to multiple first categories. Each first category is further classified to second categories. When each first category is selected, multiple second categories are displayed and a second category is finally selected.

In this embodiment, the selected first category is [travel/leisure/life]. A second category of [travel] in the first category of [travel/leisure/life] is selected. Based on this assumption, description will be made hereinafter.

Figure 8:
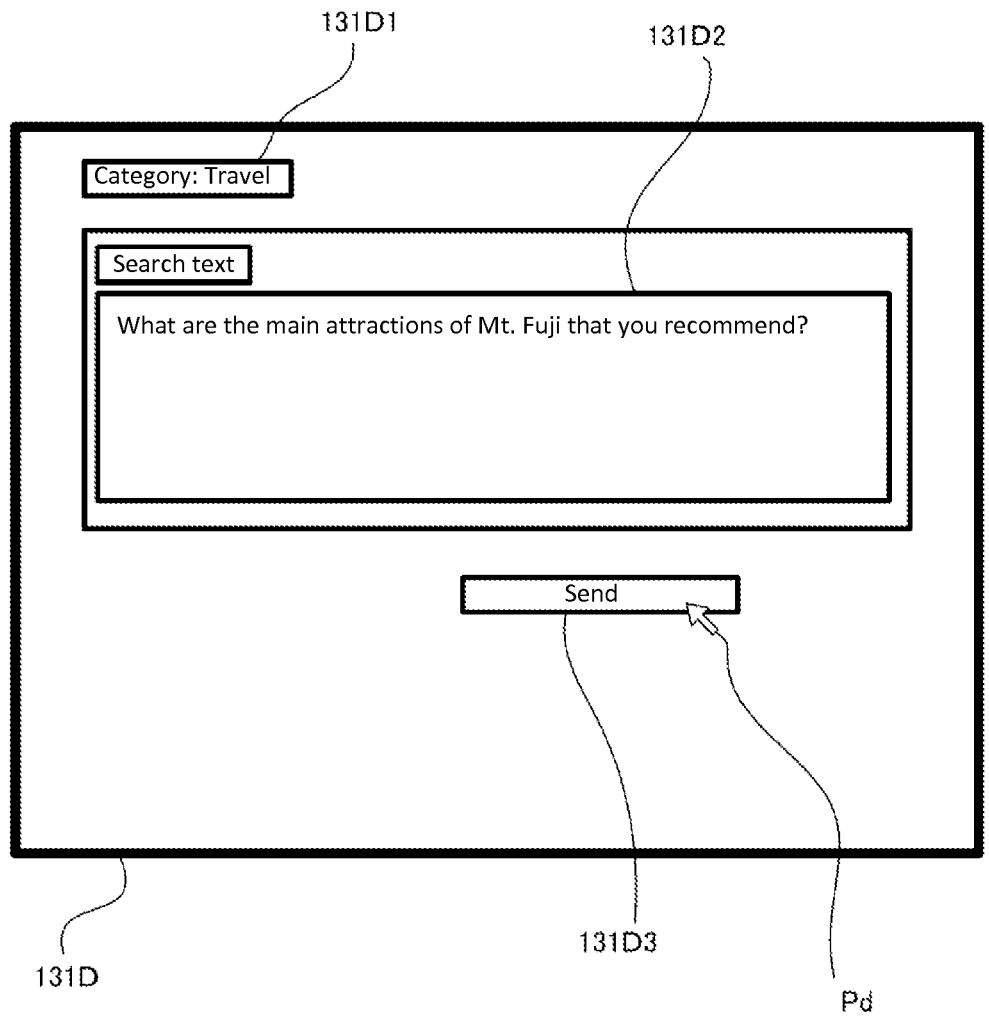
FIG. 8 is a plan view illustrating the search screen.

By placing the cursor over the question search icon 131*h* of the Q&A tool bar 131C and clicking the question search icon 131*h* (hereinafter the operation as described above will be referred to as "depress"), the screen data for the search keyword input screen as shown in FIG. 8 is received from the server 2 and the question input screen is displayed (Step S106). The question input screen 131D includes the search keyword box 131D2 (search information input region) functioning as the information display region of claim 1. The user is prompted to input, in the search keyword box 131 D2 (search information input region), a "search sentence" as search information (basic information).

The search sentence also may be a keyword. For example, when a searcher not good at exercise wants to go to Mt. Fuji, the searcher can input a sentence of "what is a seeing spot of Mt. Fuji you recommend?" Incidentally, Step S105 can be omitted, and based on the search information which is inputted in the search keyward box 131D2 displayed in Step S106, the processing for inferring the question category may be performed. For example, this processing comprises the step of listing up words which are frequently used in the category for each category determined in advance, judging whether the same words, synonyms, and similar words are included in the search information or not, and determining the category of the search information based on the order of the frequency and the number of the words contained in the category.

By depressing the transmission button 131D3, the search information and the searcher identification information are sent to the server 2 (Step S109). In the server 2, the unique information (attribute information) of the searcher (member) identified by the user ID sent in Step S103 and the search information sent in Step S109 are stored as contents data 203*a* so that the information corresponds to the user ID, thereby completing the question input processing by the user terminal 1 as a questioner terminal.

Figure 9:
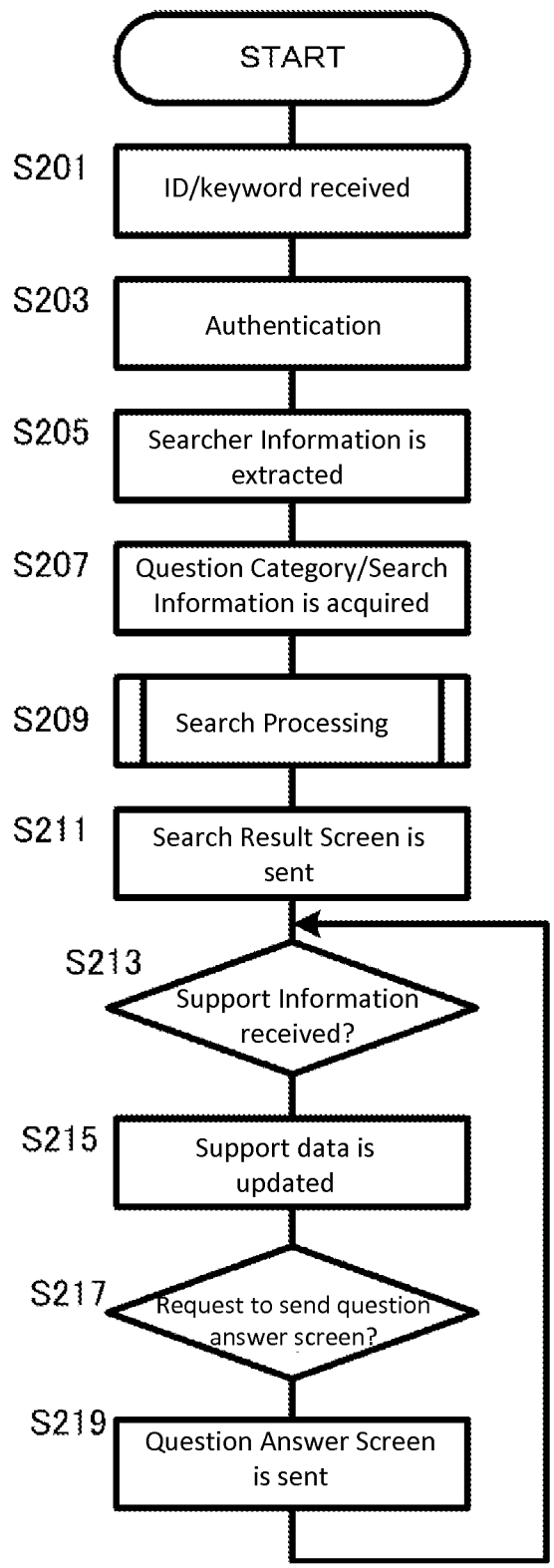
FIG. 9 is a flowchart illustrating the processing of the server.

Next, the following section will describe the operation of the server 2. FIG. 9 is a flowchart illustrating the processing operation of the server to which the search information is supplied from the user terminal 1. The user ID of the searcher and the search sentence are received from the user terminal 1 (Step S201). Then, the searcher is authorized as a member (Step S203). Then, the information of the searcher identified by the user ID is extracted from the member database DB2 (Step S205). This searcher information includes the attribute information, information regarding the past questions made by the searcher (e.g., the number of questions and the category thereof), information regarding the past answers to the questions (e.g., the number of the answers and the category thereof), and information for the past searches made by the searcher (the search sentence and keyword, the input date, place).

The next process is to acquire the search information (search sentence) inputted by the searcher through the user terminal 1 and the question category selected by the searcher (which is included in the search information) (Step S207). The search information is stored as the search data 205*a* (see FIG. 4). Based on the information acquired in Step S205 and Step S207, the search processing (Step S209) is performed. This processing is performed on the support data 202*a* and question/answer data 203*a* stored in the server 2 as well as questions and answers presented in other Q&A sites.

Figure 10:
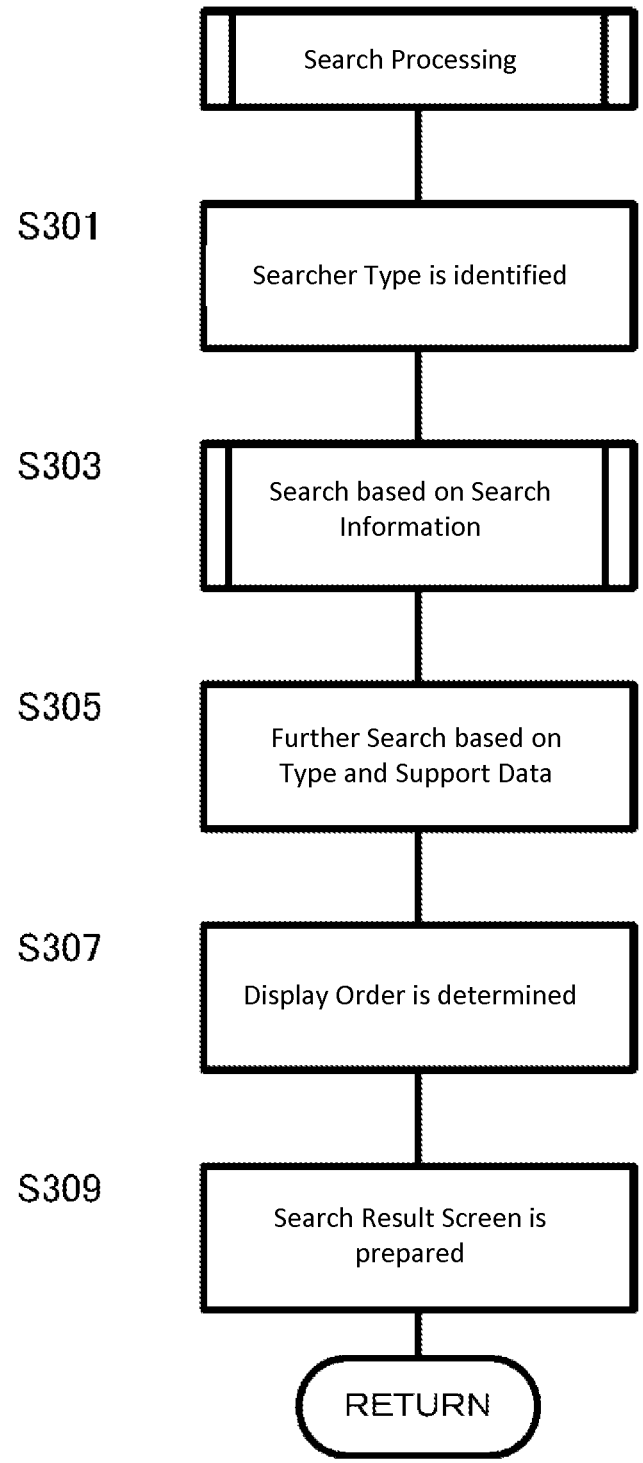
FIG. 10 is a flowchart illustrating the processing of the server.
Figure 11:
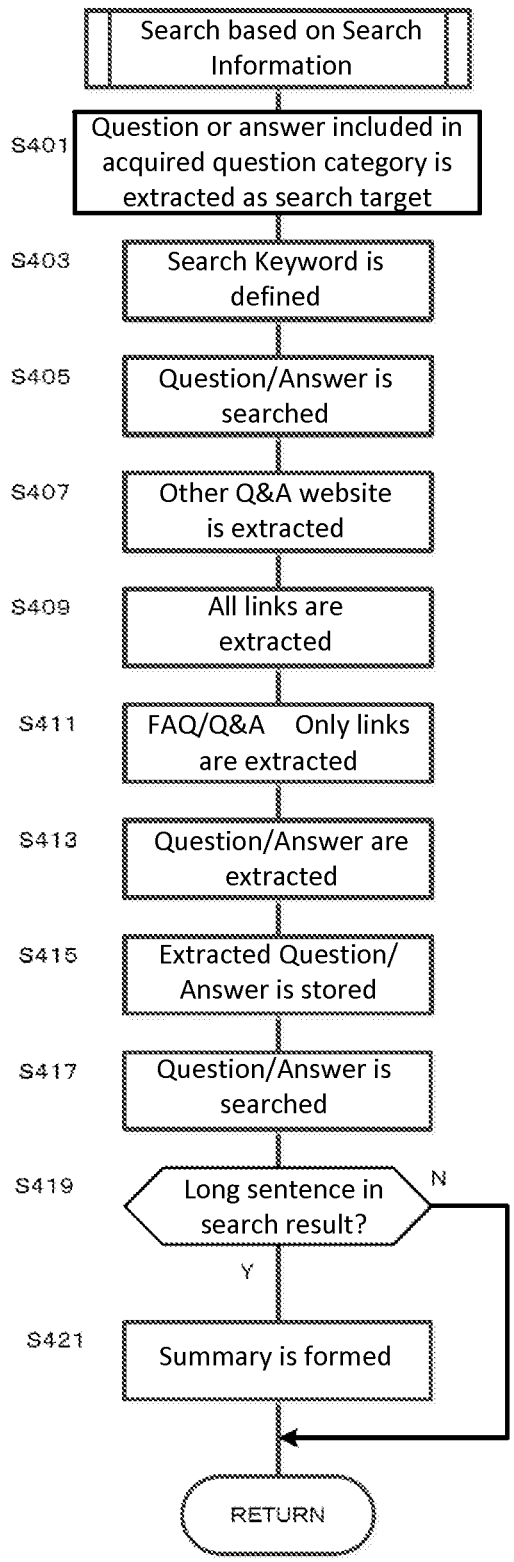
FIG. 11 is a flowchart illustrating the processing of the server.

Next, the following section will describe the search processing by the server 2 based on the flowchart shown in FIG. 10. Based on the searcher information extracted in Step S205, the searcher type is identified (Step S301). When the type is already identified, then the identified type is acquired. Next, search for the question or the answer is performed based on the search information (Step S303). FIG. 11 is a flowchart illustrating the processing routine of the search for the question sentence and the answer sentence. The search is performed from the respective databases of the question/answer data 203*a* and data 405*b* for questions or answers in other Q&A sites based on the search information and question category acquired in Step S207. Specifically, a question or an answer included in the question category acquired in Step S207 is extracted as a search target (Step S401).

When the search information is a keyword, the keyword as well as a word or synonym similar to the keyword are determined as search keyword. When the search information is a search sentence, a word included in the search sentence is extracted and the extracted word, similar word, and synonym are determined as search keyword (Step S403). Next, based on the determined keyword, the question or the answer including the keyword is searched from the question/answer data 203*a* (Step S405). Incidentally, even if the searched question does not include search keyword, the answer to the question may be extracted and added to the search result as an answer including keyword. And even if the searched answer does not include search keyword, the original question corresponding to the answer may be extracted and added to the search result as a question including keyword. The addition of questions or answers which does not include a search keyword in this manner, it becomes possible to find useful information, which the user is not aware.

Next, page of other Q&A website is extracted (Step S407). In this embodiment, other Q&A website is selected in advance, and URL of the website is stored. Thus, the URL is read out to access the other Q&A website. Extraction of the other Q&A website may be not limited to the configuration to access a site which is already selected as described above. It may be configured to search the other Q&A website each time. In this case, the word that symbolized the Q&A website is selected as the search keyword ("FAQ", "Q&A", etc.). Furthermore, the keywords which is determined based on the inputted search information are multiplied together to create a search condition. The other Q&A website may be extracted by this search condition. In this case, the user can easily extract a site in which the information close to the search field is posted, and efficiently search more valuable questions or answers. Other site extract means is constituted by Step S407. Here, the sites to be extracted are not limited to the Q&A website. If the question and answer to the question are posted on a page, the page is added as a target to be searched, or to be extracted and accumulated. The sentence listed in the description page of goods and theories is not in the form of questions and answers. By summarizing the listed sentence and processing the sentence in the form of questions and answers, it could be the target to be searched, or to be extracted and accumulated.

Then, all links containing in the page of the extracted site are extracted (Step S409). Among the multiple links that have been extracted, only those linked to the FAQ (Frequently Asked Qestions) page and Q&A (Question and Answer) page are further extracted (Step S411). Here, FAQ page is a page, in which frequently asked questions and their answer are published in the form of a list. And Q&A page is a page, in which questions and answers to the questions are displayed. In this extracting method of the links, the following criteria is used as evaluation criteria: for example, whether the link title is interrogative sentence or not; whether the link title contains the expression that is used in FAQ and Q&A or not; whether multiple links which are considered to be linked to FAQ page are enumerated or not; and furthermore, whether URL of those links are similar or not. That is, in the following cases, it is judged as a link to FAQ page or Q&A page: in the case the link title is interrogative sentence; in the case the link title contains the expression that is used in FAQ and Q&A; in the case multiple links which are considered to be linked to FAQ page or Q&A page are enumerated; and furthermore, in the case URL of those links are similar.

In addition, when frequent expression used as a link title to FAQ page or Q&A page is included in a page, the processing to come back to step S409 as a link on the way to FAQ page or Q&A page and repeat processing is performed. Here, with the frequent expression used as a link title, for example, about "FAQ" "Q&A" "support" "common question" "about . . . ." Moving to the page of the link which is extracted in step S411, a question sentence and an answer sentence are extracted from the page (Step S413). For example, when a sentence same as a link title is included, the sentence is extracted as a question sentence, and the answer to the question is extracted as an answer sentence.

Alternatively, in step S411, when the link is extracted according to the existence of plural links which have similar URL, each page of the link is compared, and a different part is extracted as a question sentence and an answer sentence. For the question sentence or the answer sentence of other Q&A sites extracted in this way, new file related to the question or the answer is made individually, and the question sentence and the answer sentence are separated, and stored separately. Furthermore, the URL of a displayed page is stored as identification information (Step S415). In addition, a storage domain for the case that there is a support expression described later is secured.

For an extracted question sentence and answer sentences, the question or the answer including the search keyword is searched (step S417). For a searched question sentence and an answer sentence, it is determined whether each sentence is longer than predetermined length (or greater than the predetermined number of letters) (Step S419). In the case that the sentence is longer than predetermined length, it becomes hard to understand contents in a short time when the search result is listed. Therefore, summary is formed (step S421). This formation of summary is carried out by well-known summary forming algorithm. After the above-mentioned processing, it is returned to main routine. Other sites search results question information is comprised by the question which was searched in Step 417. In the same way, other sites search results answer information is comprised by the answer which was searched in Step 417.

In the above-mentioned processing, other sites question search means and other sites answer search means are constructed by Step S409-S417. Link extraction means is constructed by Step S409, and Q&A link extraction means is constructed by Step S411. Question sentence extraction means and answer sentence extraction means are constructed by step S413. Summary forming means is constructed by Step S419-S421. Whenever users perform search operation, Step S407-S415 is carried out. However, the processing of step S407-S415 may be carried out at regular interval separately from the search operation of the user, and the questions and answers of other Q&A sites may be accumulated in the question information storage means and the answer information storage means in advance. The constitution can be adopted, in which search is carried out from the questions and answers of other Q&A sites already accumulated, when the user perform the search operation. In this constitution, because the support expression information can be accumulated every question sentence, answer sentence, more useful search results can be acquired.

Figure 12:
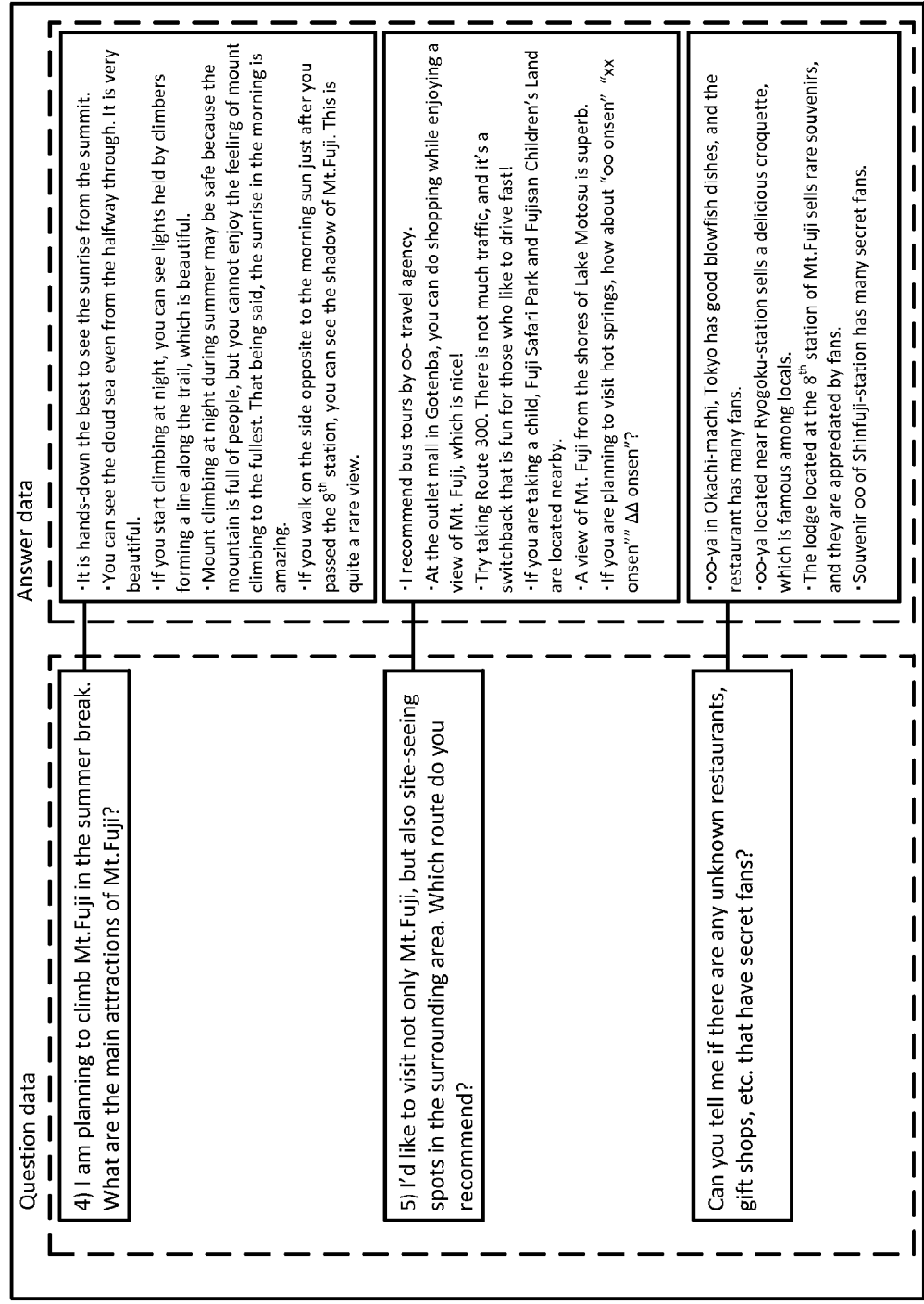
FIG. 12 is a schematic view illustrating the structure of question/answer data

Next, based on the searcher type identified in Step S301, the questions and answers extracted in Step S303 are further searched (Step S305). As shown in FIG. 12, in the question/answer data 203a, the respective questions and answers which are stored in different storage regions while maintaining the association. The respective questions and answers are divided to a question group and an answer group so that the respective questions and answers can be separately searched. Each question and each answer are stored to be associated with support data. Namely, when the question or answer is supported by a member, the type of the supported member is counted and the count number is stored. Thus, each question and answer stores therein the distribution of the types of the members who have supported the contents thereof. In Step S305, a question and an answer supported by the member of the same type as the type of the searcher are extracted.

An example of the extracted question and answer is shown in FIG. 13. This search result shows questions and answers when search is performed by keywords of "Mt. Fuji", "seeing spot", and "recommended" as well as the synonyms thereof and the question belongs to the category of travel. "Fuji" "Fujimi" "Japan one", etc. are enumerated as a synonym of "Mt. Fuji". "Spot" "characteristic" "sightseeing" "famous place" "noted product", etc. are enumerated as a synonym of "the highlight". "Recommendation" "delicious" "pleasant" "unrivaled articles", etc. are enumerated as a synonym of "the recommendation". These keywords are added as search keyword, and a search is carried out. The types of the members who showed a support pronouncement to these questions and answers are stored. As shown in FIG. 14, the support number is stored for each of the supported 64 types. For example, in FIG. 14, it is stored that the question 1) is supported by one type 2 member, five type 4 members, six type 5 members, and six type 6 members 6, respectively. It is stored that the answer 1) is supported by one type 1 member, two type 2 members, eight type 3 members, and five type 5 members, respectively.

When the searcher is a type 6 searcher to the database as described above, such question and answer are prioritized that have a higher value supported by the type 6 and are arranged in an order of higher values. The type 6 represents, for example, a male in the 30s who likes going out and who is not so confident about his physical strength. For such a type of a searcher, the question 4), etc. is not so useful while the question 5) and the question 7) are useful. Similarly, the answer 5) and answer 6) are not so useful and the answer 7) and answer 12), etc. are useful for the type 6. In addition, when the data acquired as an expression of the evaluations is a nonsupport expression that is the expression of a negative evaluation, order information is decided so that the question and answer with a little number of expressed times become the top with precedence.

As described above, depending on the searcher type, an order for displaying the searched question and the answer is determined as order information (Step S307). For example, it is displayed in descending order of the number of the expressed support by the same type users. In the determination of the display order in Step S307, the determination may be made based not only on the number of the supports of the same type but also on the total number of supports of the question and an answer to the question. For example, when the number of the supports for the question is small but the number of the supports for the answer to the question is large, then it means that the question is a question having a useful answer to the searcher thus has a high order. Then, a display screen is prepared in which the questions and answers searched based on the display order determined in Step S307 (Step S309). Then, the display screen stands until the screen can be opened based on a request from the user terminal 1 (Step S211).

Then, the processing returns to the processing by the user terminal in FIG. 6. It is determined whether the search result screen is sent from the server 2 or not (Step S111). When the search result screen is sent from the server 2, then the search result screen is displayed (Step S113).

Figure 15:
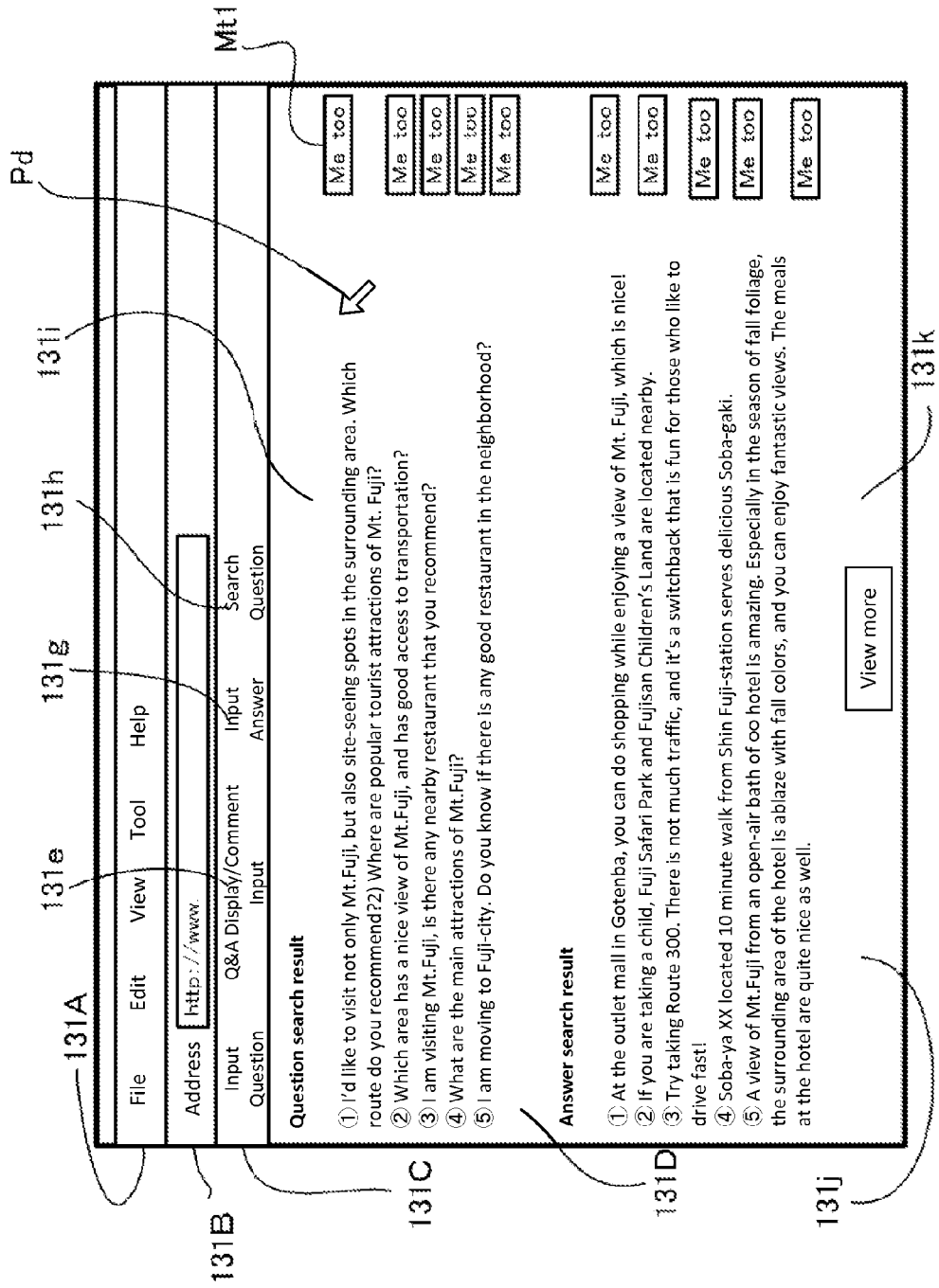
FIG. 15 is a plan view illustrating the search result screen displaying the search result subjected to the prioritization.

FIG. 15 is a plan view illustrating the display screen showing the search result screen. The display screen prepared in Step S309 is displayed in the display region 131D. The display region 131D includes, at the top section thereof, the question search result display region 131i for displaying a searched question and includes, at the lower section thereof, the answer search result display region 131j for displaying a searched answer. The question search result display region 131i and the answer search result display region 131j constitute the search result display region of claim 1.

Figure 16:
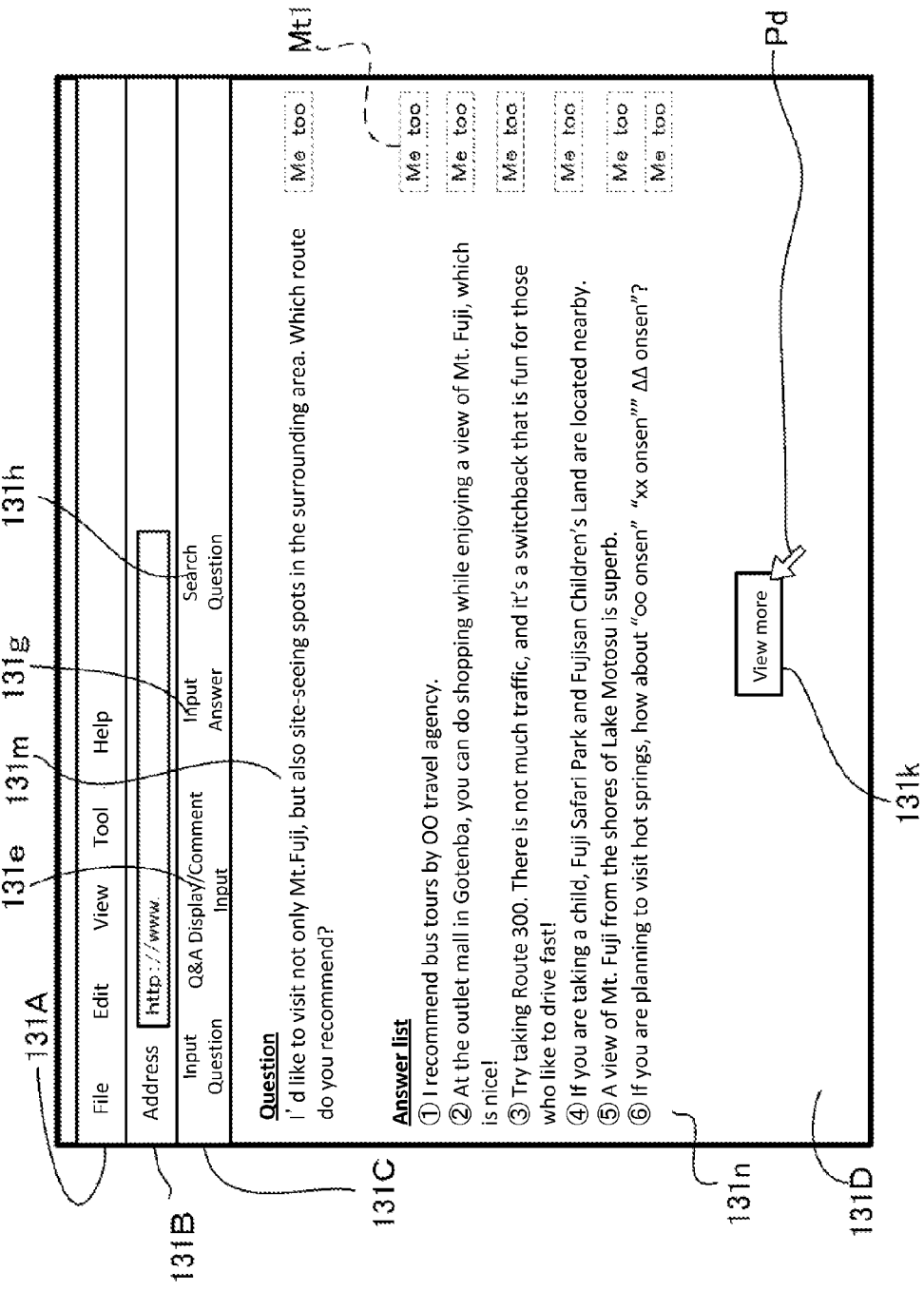
FIG. 16 is a plan view illustrating the question answer screen displaying an answer list to the question displayed on the search result screen.

The list of searched questions is displayed in the question search result display region 131i. The list of searched answers is displayed in the answer search result display region 131j. The question list is configured so that each placed question itself functions as a link button. Thus, by placing the cursor Pd over each question and clicking the question, the question answer display screen as shown in FIG. 16 is displayed in which an answer to the clicked question is displayed.

On the other hand, each question and each answer in the display has the support pronouncement button Mt1 functioning as the specifying region of claim 3. When the searcher determines that the displayed question has useful (valuable) contents, then the searcher places the cursor Pd over the support pronouncement button Mt1 to depress the cursor Pd. As a result, information identifying the supported question or answer and the information for the type of the searcher having showed a support pronouncement are sent from the user terminal 1 to the server 2. The server 2 updates the type information based on the received information with regard to each question or answer for which a support is pronounced. Specifically, the number of supports is increased by one for the type corresponding to the searcher type. This processing constitutes the question information update means and the answer information update means.

In addition, other than a method to confirm the intention of the support expression by the support pronouncement button, the following method can be used. That is, the operation reeling a page up and down is monitored. When the operation to reeling a page is stopped in the state that prescribed question or answer is appeared on the page, it may be determined that the appeared question or answer is supported. Alternatively, when the page is maintained in an open state more than scheduled time in the state that one question and answer was appeared in the display area, it may be determined that it took time to read the page and it may be constituted to determine that the question and answer appearing in the page is supported.

The searched question list displayed in the question search result display region 131i is displayed based on the display order determined in Step S307. Namely, in an order from the top side to the lower side, questions expected to be more matching the searcher type are sequentially arranged. Thus, the top list among the displayed lists 1 to 5 shows a question expected to be most useful for the searcher. The searcher can place the cursor Pd over this question 1 and depresses the question 1 to thereby allow the display region 131D to display a screen showing an answer to the question 1. FIG. 16 shows a screen showing the question answer information. This display region 131D includes the question sentence display region 131m for displaying a question sentence and the answer sentence display region 131n provided under the question sentence display region 131m. In the question sentence display region 131m, a question specified in the screen of FIG. 16 is displayed. And in a region under the question sentence display region 131m, a list of answers posted to the question sentence is displayed. Each answer list may have the support pronouncement button Mt1.

The above processing will be described with reference to the flowchart of FIG. 7. It is determined whether the searcher has depressed any support pronouncement button Mt1 in the display screen in Step S113 with regard to a question or answer or not (Step S115). Once the searcher has depressed any support pronouncement button Mt1, the support information (information identifying the supported question or answer and the type of the searcher having showed a support) is sent to the server 2 (Step S117).

Then, it is determined whether a question included in the question list is specified by the cursor Pd or not (Step S119). When a question included in the list is specified by the cursor Pd, then the server 2 is requested to send the screen (question answer screen) displaying the question answer information including the specified question sentence and an answer sentence. Then, the screen is received and displayed (Step S121).

The screen displaying the question answer information is prepared simultaneously with the preparation of the search result screen in Step S309.

An answer to the question displayed at the top of the list is expected to be the most useful answer to the searcher. Thus, the searcher can easily obtain many pieces of useful information through a simple search. When the support pronouncement button Mt1 is displayed in the screen showing the question answer information, it is determined whether the support pronouncement button Mt1 is depressed or not in the screen (Step S123). When the support pronouncement button Mt1 is depressed, then the support information is sent to the server 2.

Next, the processing of the server associated to the above processing will be described with reference to the flowchart of FIG. 9. In Step S211, the search result screen is sent to the user terminal 1. Then, it is determined whether support information is received from the user terminal 1 or not (Step S213). When the support information is received, based on the received support information, a file prepared for the supported question or answer is identified and the type information of the file is updated. Specifically, this searcher is type 6 and thus one is added to the support number of the type 6 of the supported question.

In the next step, a determination is made in Step 217 as to whether a request to send the question answer screen was issued based on Step S121 or not. Once such a request exists, the question answer screen is sent to the user terminal 1 (Step S219). As shown in FIG. 15, in the search result displayed in the processing as described above, for the type 6 searcher (i.e., a male in the 30s who likes going out and who is not so confident about his physical strength), a question or answer having contents requiring a high physical strength (e.g., climbing Mt. Fuji) is positioned at a lower level (or is not displayed). Here, the fourth answer search result is not an answer which replied as the highlight of Mt. Fuji.

Although it is unanticipated search results for the searcher who searched the highlight of Mt. Fuji, the searcher can acquire it as useful information. Alternatively, such an answer is also displayed that does not match the first search contents and that is close to the preference of the searcher (e.g., the answer 3 including "Route 300"). A male in the 30s also may have a small child and thus the answer 2 including "going out with children" has a higher priority order. Although these are not the answers which are intended to be extracted at the time of a search by a searcher, these are an answer to know that it is useful information for a searcher for the first time by watching search results.

Figure 17:
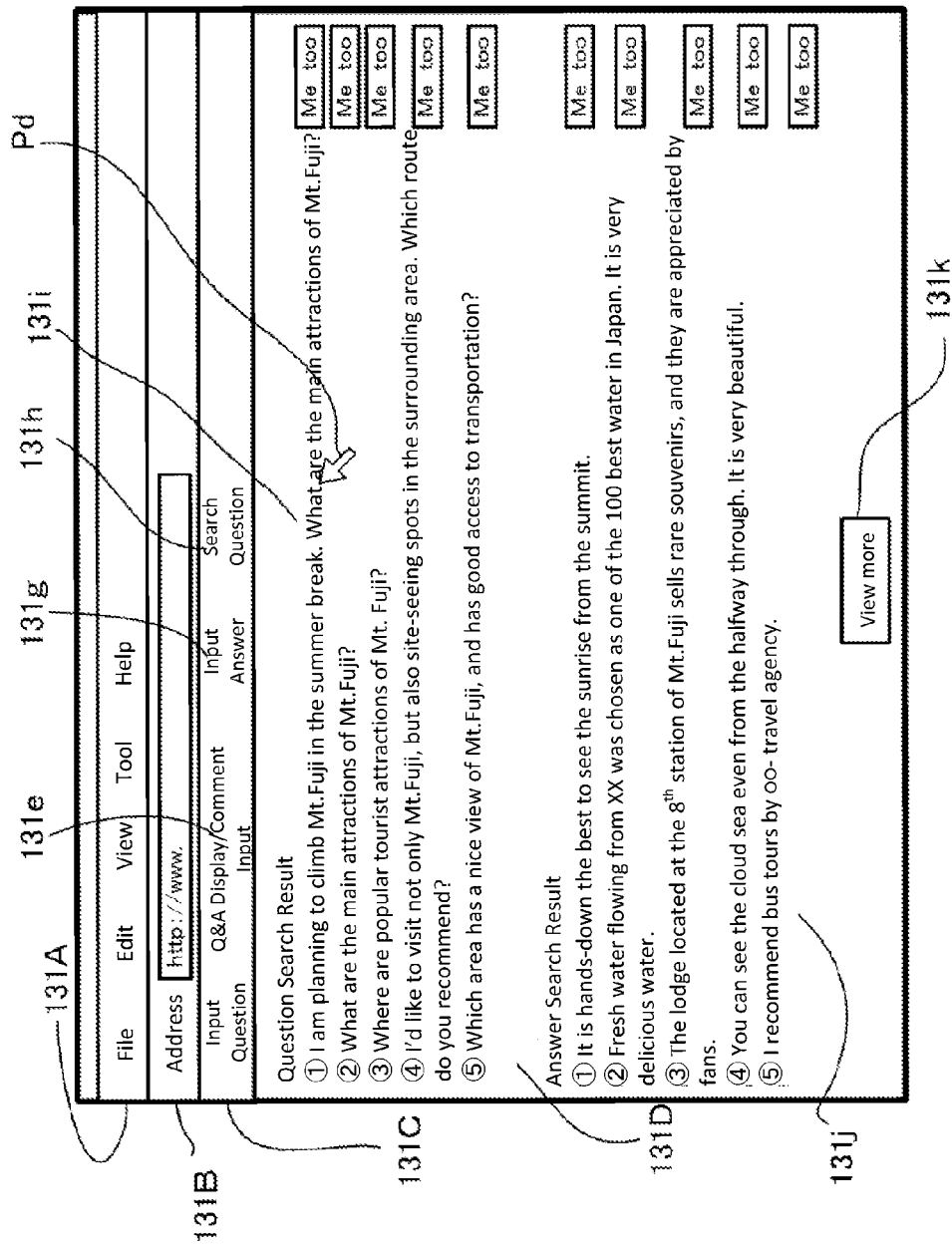
FIG. 17 is a plan view illustrating the search result screen when another type is searched.

On the other hand, an example of the search result will be described based on FIG. 17 and FIG. 18 in which a search is performed by the type 7 searcher. The type 7 shows a female in the 20s who likes going and who is confident about her physical strength (having one surface of active). For the search by such a searcher, questions and answers related to the climbing of Mt. Fuji have a higher order and the answer list (FIG. 18) to the top question can provide much information regarding mountain climbing.

As described above, the search by different types of searchers results in the display of different search results, thus realizing the extraction of more useful information for the respective searchers. In addition, the information that is expected to be valuable potentially for a searcher can be acquired. The display order determined in Step S307 also may be based on the following criteria.

Specifically, a question or answer from a member registered as an expert is reliable. Thus, a question or answer from an expert member may have a higher priority order than other questions or answers of the same order. Alternatively, a long question or answer may include larger contents. Thus, a long question or answer also may have a higher priority order. The Q&A sites which are extractied in step S407 (extraction of other Q&A website) may be homepages such as companies not only the specialized site of Q&A. Because the FAQ page/ Q&A page exists in such site in which the question and the answer to the question for the product or the service was put on, it can be constituted to extract an answer to the question of such a page.

Furthermore, when predetermined other Q&A sites exist, the constitution of the site is decided. Thus, algorithm for extracting a question and an answer is made exclusively for the decided Q&A site and a question sentence and an answer sentence is extracted using the algorithm regularly. In addition, the page in which question and answer to question are displayed can be targeted for extraction even if FAQ page and Q&A page are not arranged especially in the sites.

What is claimed is:

1. A server having a CPU, a storage section for storing computer program which is readable by the CPU, and a communication section, wherein the storage section includes:
   a question information storing region for storing accumulated questions; and
   an answer information storing region for storing accumulated answers to the accumulated questions independently from the accumulated questions, the accumulated answers being associated with the accumulated questions;
   wherein the accumulated questions are associated with question support numbers for each type of member, the question support numbers being counted when the accumulated questions are supported by the member,
   wherein the accumulated answers are associated with answer support numbers for each type of member, the answer support numbers being counted when the accumulated answers are supported by the member,
   wherein the communication section receives search information for searching the accumulated questions and the accumulated answers, and a user ID of a searcher;
   wherein the CPU identifies a searcher type based on the user ID of the searcher received by the communication section,
   searches for questions and answers including the search information received by the communication section from the accumulated questions and the accumulated answers,
   extracts questions and answers, from the searched questions and the searched answers, supported by member of a same type as the identified searcher type,
   arranges the extracted questions and extracted answers, as an order for displaying the extracted questions and the extracted answers, in an order of higher values of the question support numbers and the answer support numbers corresponding to the identified searcher type, and
   prepares a display screen in which the extracted questions and the extracted answers are arranged based on the order for displaying.

2. The server according to claim 1, further comprising user information storage section for storing attribute information of the respective user.

3. The server according to claim 1, wherein the communication section further receives support information to a specific question or answer.

4. The server according to claim 3, further comprising a question information update section for updating the question support numbers based on the received user ID and support information.

5. The server according to claim 3, further comprising an answer information update section for updating the answer support numbers based on the received user ID and support information.

6. The server according to claim 1, further comprising other sites extraction section for extracting other sites, wherein: the CPU searches for questions from accumulated questions in the question information accumulation section of extracted other Question and Answer (Q&A) sites, and searches for answers from accumulated answers in the answer information accumulation section of the other Q&A sites searched by the other sites search section, and the communication section also transmits other sites search result question information searched by the CPU and other sites search result answer information searched by the CPU.

7. The server according to claim 6, wherein the other sites extraction section is configured to extract the other sites based on the predetermined address of the website.

8. The server according to claim 6, wherein the CPU extracts links from pages included in sites extracted by the other sites extraction section; extracts links to the pages that posted questions and answers to questions from extracted plural links; and extracts a question sentence among the pages of the sites extracted by the CPU.

9. The server according to claim 6, wherein the CPU extracts links from pages included in sites extracted by the other sites extraction section; extracts links to the pages that posted questions and answers to questions from extracted plural links; and extracts an answer sentence among the pages of the sites extracted by the CPU.

10. A method for searching for a question and an answer performed on a computer having a CPU, a storage section for storing computer program which is readable by the CPU, and a communication section, the method comprising:

collecting a question and an answer to the question from a user;

storing the question in the storage section such that accumulated questions are associated with question support numbers for each type of member, the question support numbers being counted when the accumulated questions are supported by the member, storing the answer in the storage section independently while the question and the answer being associated such that accumulated answers are associated with answer support numbers for each type of member, the answer support numbers being counted when the accumulated answers are supported by the member;

receiving, by the communication section, search information for searching the accumulated questions and the accumulated answers, and a user ID of a searcher;

identifying, by the CPU, a searcher type based on the user ID of the searcher received by the receiving;

searching, by the CPU, for questions and answers including the search information received by the receiving from the accumulated questions and the accumulated answers;

extracting, by the CPU, questions and answers, from the searched questions and the searched answers, supported by member of a same type as the identified searcher type;

arranging, by the CPU, the extracted questions and extracted answers, as an order for displaying the extracted questions and the extracted answers, in an order of higher values of the question support numbers and the answer support numbers corresponding to the identified searcher type, and preparing, by the CPU, a display screen in which the extracted questions and the extracted answers are arranged based on the order for displaying.

11. The method according to claim 10, further comprising classifying the user to multiple types based on the user ID.

12. The method according to claim 11, further comprising: identifying the type of searching user; and performing search for the question and the answer based on the type.

* * * * *